United States Patent
Kanazawa

(10) Patent No.: US 9,372,574 B2
(45) Date of Patent: Jun. 21, 2016

(54) TOUCH PANEL CONTROLLER, INTEGRATED CIRCUIT, TOUCH PANEL DEVICE, AND ELECTRONIC DEVICE

(71) Applicant: SHARP KABUSHIKI KAISHA, Osaka-shi, Osaka (JP)

(72) Inventor: Yusuke Kanazawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 57 days.

(21) Appl. No.: 14/408,223

(22) PCT Filed: Jun. 21, 2013

(86) PCT No.: PCT/JP2013/067127
§ 371 (c)(1),
(2) Date: Dec. 15, 2014

(87) PCT Pub. No.: WO2014/002907
PCT Pub. Date: Jan. 3, 2014

(65) Prior Publication Data
US 2015/0138140 A1     May 21, 2015

(30) Foreign Application Priority Data

Jun. 25, 2012 (JP) .................. 2012-142484

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
CPC combination set(s) only.
See application file for complete search history.

(56) References Cited

U.S. PATENT DOCUMENTS

2006/0158202 A1    7/2006   Umeda et al.

FOREIGN PATENT DOCUMENTS

JP    2005-152223 A    6/2005

*Primary Examiner* — Larry Sternbane
(74) *Attorney, Agent, or Firm* — Birch, Stewart, Kolasch & Birch, LLP

(57) ABSTRACT

A touch panel controller (1A) includes: a capacitor drive portion (5A); a multiplying portion (2A) which performs multiplication of first linear sum signals by a second code sequence to obtain signals and then performs addition of the signals to generate a second linear sum signal; an inner product operation portion (3A) which generates a first inner product operation signal by calculating an inner product of the second linear sum signal and the second code sequence; an inner product operation portion (3AA) which generates a second inner product operation signal by calculating an inner product of the first inner product operation signal and the first code sequence. This makes it possible to reduce a mounting area of the touch panel controller.

18 Claims, 16 Drawing Sheets

FIG. 2

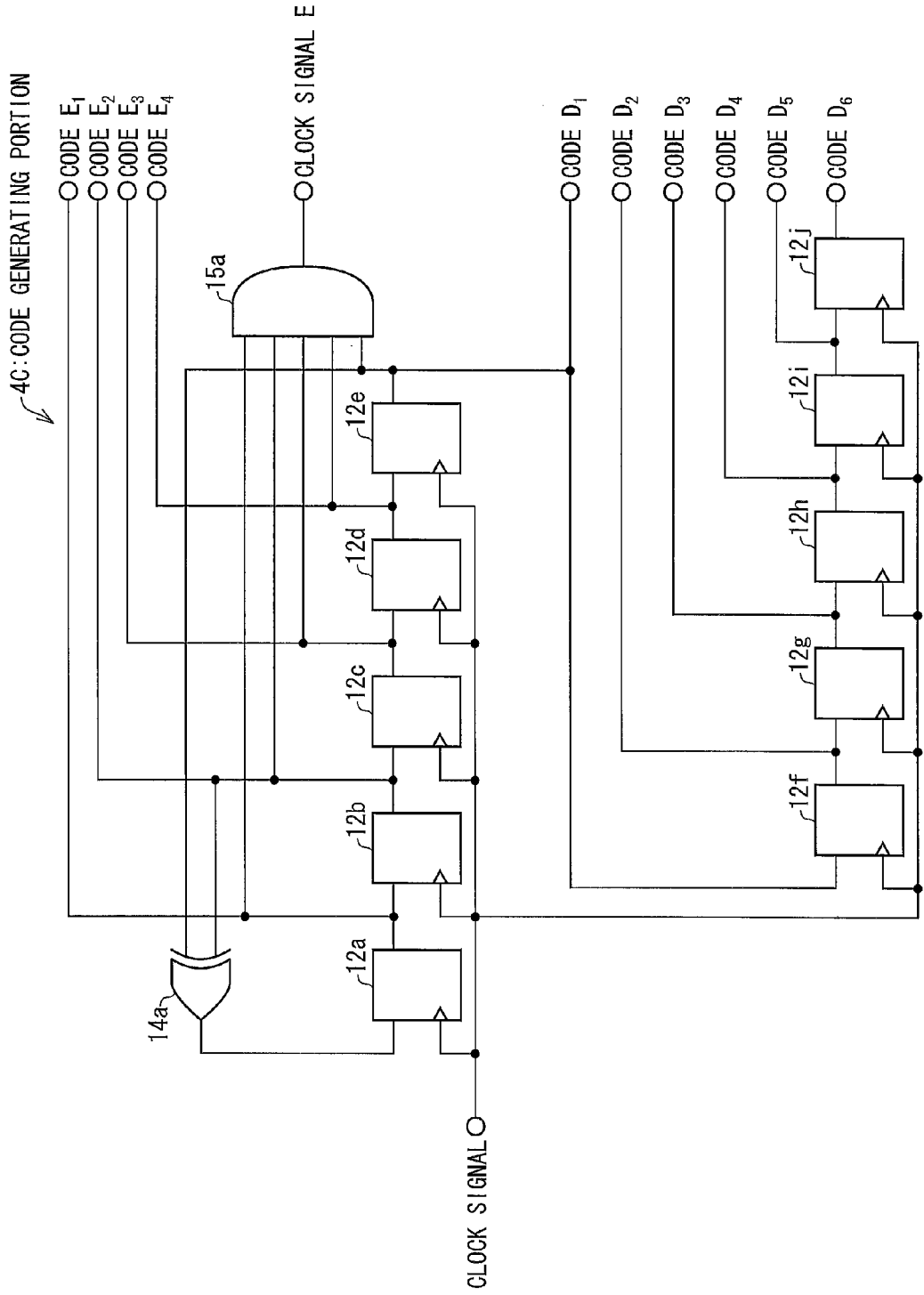
F I G. 12

F I G. 1 4
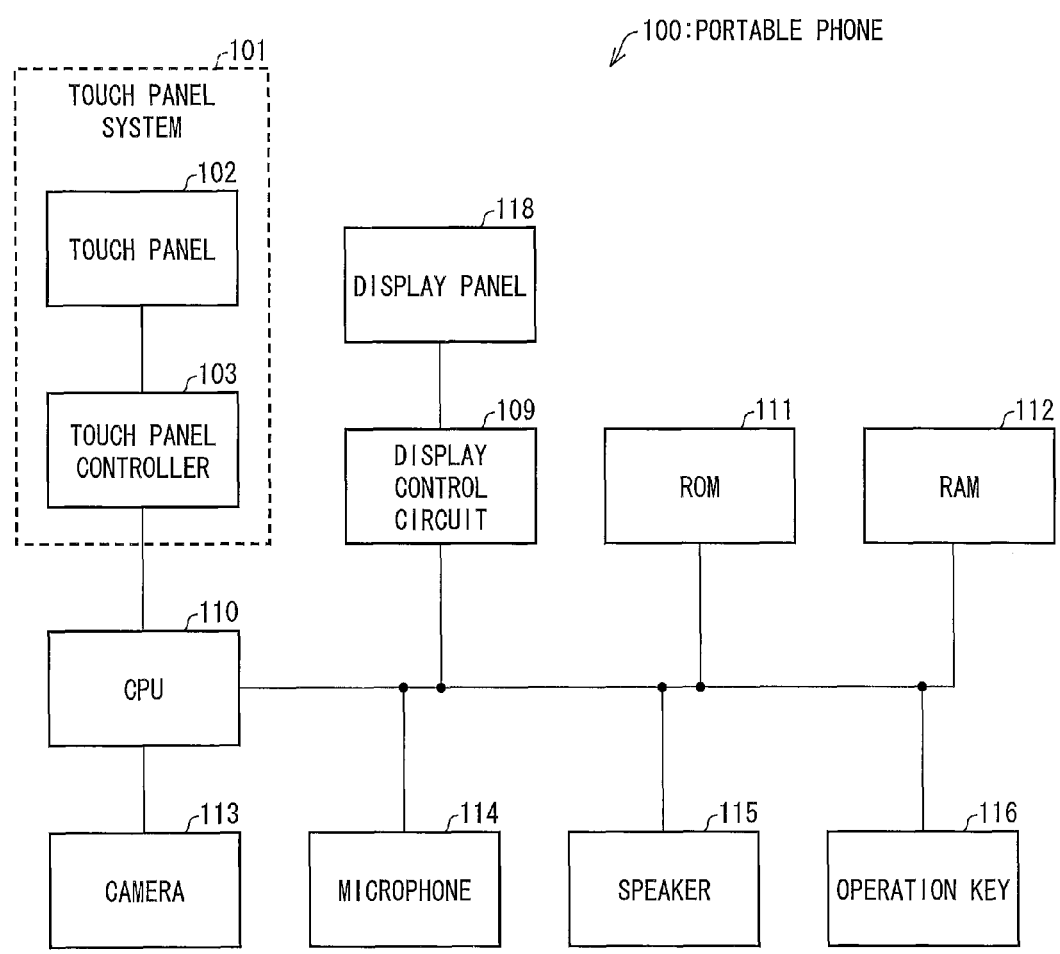

F I G. 1 5
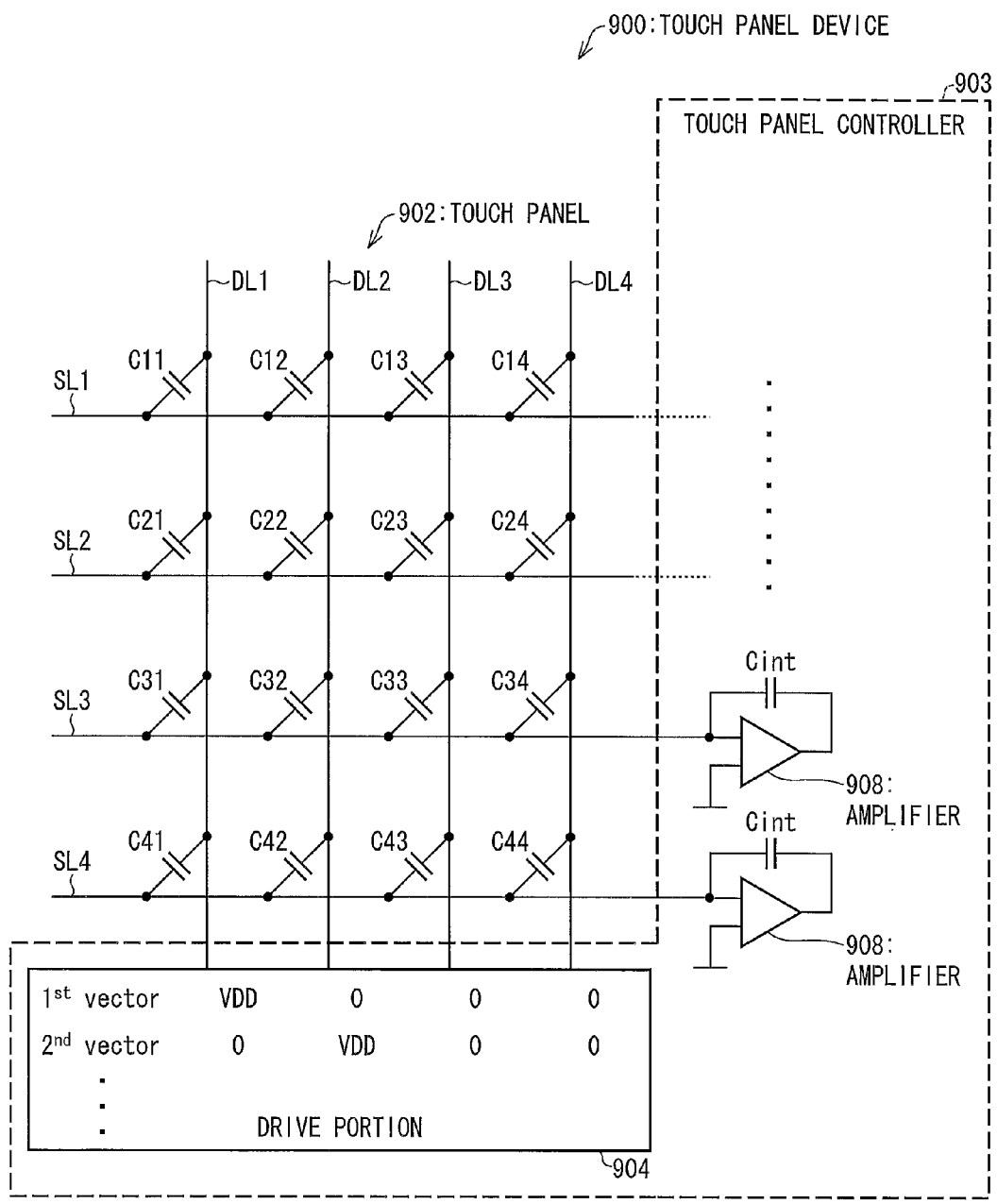

F I G. 1 6

$$1^{st} \text{ vector} \quad \frac{-(C_{31})Vdrive}{C_{int}} \quad \cdots (\text{Exp. 1})$$

$$2^{nd} \text{ vector} \quad \frac{-(C_{32})Vdrive}{C_{int}} \quad \cdots (\text{Exp. 2})$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} C31 \\ C32 \\ C33 \\ C34 \end{pmatrix} = \begin{pmatrix} Y1 \\ Y2 \\ Y3 \\ Y4 \end{pmatrix} \quad \cdots (\text{Exp. 3})$$

$$\begin{pmatrix} C31 \\ C32 \\ C33 \\ C34 \end{pmatrix} = \begin{pmatrix} Y1 \\ Y2 \\ Y3 \\ Y4 \end{pmatrix} \quad \cdots (\text{Exp. 4})$$

TOUCH PANEL CONTROLLER, INTEGRATED CIRCUIT, TOUCH PANEL DEVICE, AND ELECTRONIC DEVICE

TECHNICAL FIELD

The present invention relates to a touch panel controller that controls a touch panel having capacitors provided at respective intersections between a plurality of drive lines and a plurality of sense lines, an integrated circuit, a touch panel device, and an electronic device.

BACKGROUND ART

Patent Literature 1 discloses, as a device that detects the values on capacitors distributed in a matrix manner, a capacitance detecting circuit that detects a distribution of the electrostatic capacitances of capacitors arranged in rows and columns demarcated by M drive lines and L sense lines. The capacitance detecting circuit, which capitalizes on a decrease in capacitance of a capacitor at an area touched with a finger or a pen, detects a contact area corresponding to a touch of a finger or a pen on the touch panel by detecting a change in capacitance.

FIG. 15 is a schematic view showing a configuration of a conventional touch panel device 900. Further, FIG. 16 is a diagram for explaining a method for driving the touch panel device 900. The touch panel device 900 includes a touch panel 902 and a touch panel controller 903. The touch panel 902 has drive lines DL1 to DL4, sense lines SL1 to SL4, and capacitors C11 to C44 disposed in locations at intersections between the drive lines DL1 to DL4 and the sense lines SL1 to SL4. Further, the touch panel controller 903 has a drive portion 904 and amplifiers 908.

The following will describe how the touch panel device 900 converts the electrostatic capacitances into measurement values (detection values).

The drive portion 904 drives the drive lines DL1 to DL4 on the basis of a 4×4 code sequence shown in (Exp. 3) of FIG. 16. The drive portion 904 applies a voltage VDD when an element of the code sequence is "1", and applies a zero voltage in the case of an element "0".

The touch panel device 900 has four amplifiers 908 disposed so as to correspond to the sense lines SL1 to SL4, respectively. The four amplifiers 908 receive and amplify linear sums Y1 to Y4 of electric charges on capacitors along with the sense lines SL1 to SL4 driven by the drive portion 904, respectively.

Specifically, in the first round of driving of the four rounds of driving based on the 4×4 code sequence, the drive portion 904 applies the voltage VDD to the drive line DL1 and applies a zero voltage to the remaining drive lines DL2 to DL4. Then, for example, through the sense line SL3, an output corresponding to an electric charge of the capacitor C31 as indicated by (Exp. 1) of FIG. 16 is fed as a measurement value Y1 to the amplifier 908.

Then, in the second round of driving, the drive portion 904 applies the power supply voltage VDD to the drive line DL2 and applies a zero voltage to the remaining drive lines DL1, DL3, and DL4. Then, through the sense line SL3, an output corresponding to the capacitor C32 as indicated by (Exp. 2) of FIG. 16 is fed as a measurement value Y2 to the amplifier 908.

Similarly, in the third round of driving, the drive portion 904 applies the power supply voltage VDD to the drive line DL3 and applies a zero voltage to the remaining drive lines. After that, in the fourth round of driving, the drive portion 904 applies the power supply voltage VDD to the drive line DL4 and applies a zero voltage to the remaining drive lines. Through the third round of driving and the fourth round of driving, the measurement values Y3 and Y4 are obtained corresponding to the electrostatic capacitances C33 and C34, respectively.

In this manner, as indicated by (Exp. 3) and (Exp. 4) of FIG. 16, the measurement values Y1, Y2, Y3, and Y4 are associated with the electrostatic capacitances C31, C32, C33, and C34, respectively.

CITATION LIST

Patent Literature

Patent Literature 1:
Japanese Patent Application Publication No. 2005-152223 (published on Jun. 16, 2005)

SUMMARY OF INVENTION

Technical Problem

Unfortunately, the touch panel device 900 requires the amplifiers to be provided for the individual sense lines. The larger the sense lines become in number, the larger the amplifiers become in number. This gives rise to the problem of increasing a mounting area of a circuit for having the amplifiers mounted thereon.

The present invention has been attained in view of the above problem, and an object of the present invention is to provide a touch panel controller having a small mounting area, an integrated circuit, a touch panel device, and an electronic device.

Solution to Problem

In order to solve the above problem, a touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence having K N-dimensional vectors to obtain K signals and then performs addition of the K signals to generate a second linear sum signal; a first inner product operation section which generates a first inner product operation signal by calculating an inner product of the second linear sum signal and the second code sequence; and a second inner product operation section which generates a second inner product operation signal for estimating values on the capacitors, by calculating an inner product of the first inner product operation signal and the first code sequence.

Another touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence having K N-dimensional vectors to obtain K signals and then performs addition of the K signals to generate a second linear sum signal; and an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

A still another touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence to obtain K signals and then performs addition of the K signals to generate a second linear sum signal, the second code sequence having K N-dimensional vectors and being a preferred pair with the first code sequence; and an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

Advantageous Effects of Invention

In a touch panel controller in accordance with an aspect of the present invention, multiplication of the K first linear sum signals by the second code sequence having K N-dimensional vectors is performed to obtain the K signals, and addition of the K signals is then performed to generate the second linear sum signal. This makes it possible to estimate values on the capacities on the basis of the second linear sum signal which is smaller in number than the first linear sum signals. Hence, it is possible to reduce the number of circuits required to process the signals for estimating the values on the capacitors. Consequently, it is possible to reduce a mounting area of a touch panel controller having a small mounting area.

BRIEF DESCRIPTION OF DRAWINGS

FIG. 2(a) of FIG. 2 is a diagram showing code sequences for causing capacitors to be driven by a capacitor drive portion provided in the touch panel device, and (b) of FIG. 2 is a diagram showing code sequences by which a code multiplying portion provided in the touch panel device multiplies linear sum signals based on electric charges on the capacitors.

FIG. 12 is a diagram showing a configuration of a code generating portion in accordance with Comparative Example.

FIG. 14 is a block diagram showing a configuration of a portable phone in accordance with Embodiment 5.

FIG. 15 is a circuit diagram showing a configuration of a conventional touch panel device.

FIG. 16 is a diagram for explaining a method for driving the touch panel device.

DESCRIPTION OF EMBODIMENTS

The following will describe embodiments of the present invention in detail.

Embodiment 1

Configuration of Touch Panel Device 7

Figure 1:
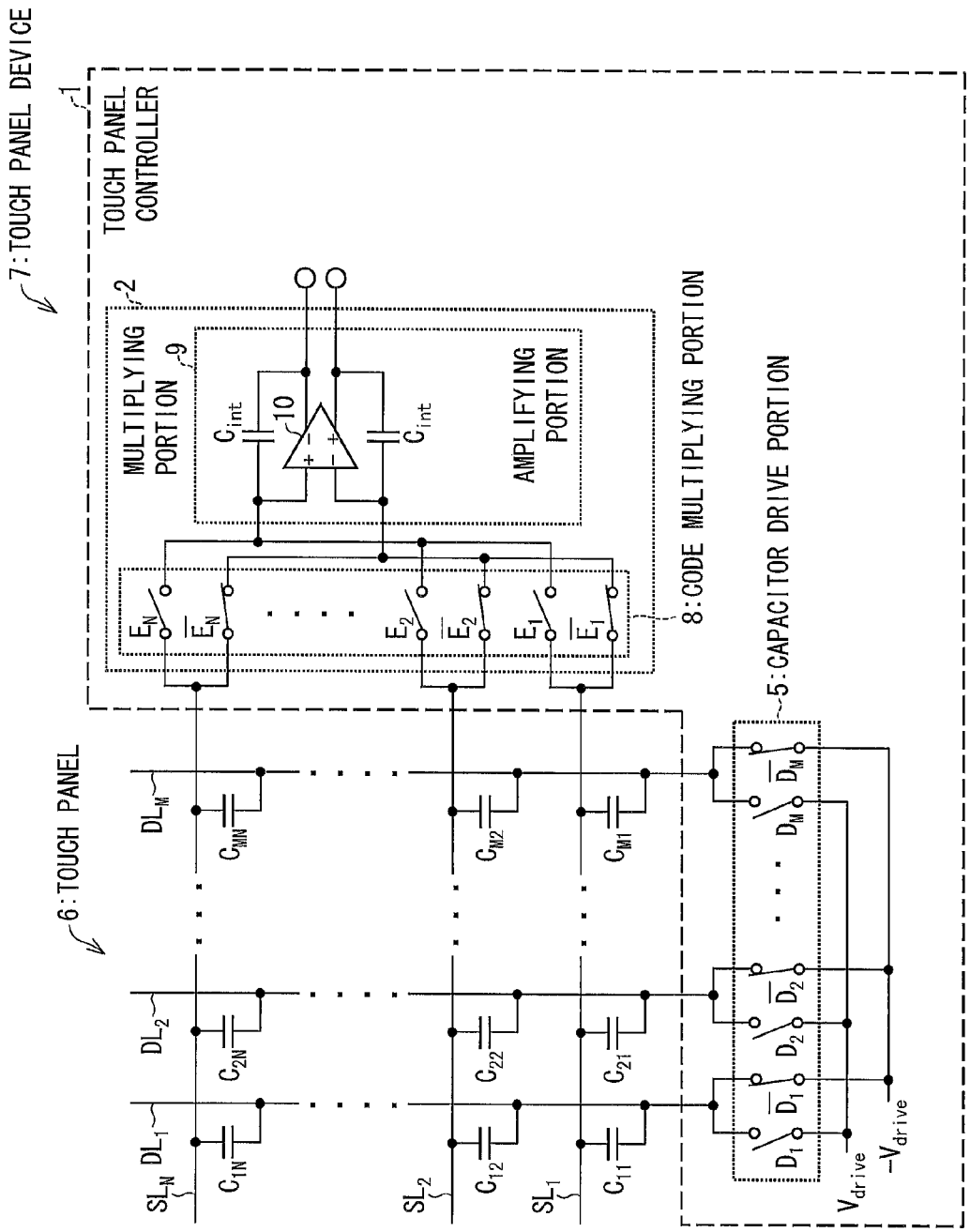
FIG. 1 is a circuit diagram showing a configuration of a touch panel device in accordance with Embodiment 1.

FIG. 1 is a circuit diagram showing a configuration of a touch panel device 7 in accordance with Embodiment 1. The touch panel device 7 includes a touch panel 6 and a touch panel controller 1. The touch panel 6 includes M drive lines $DL_1$ to $DL_M$ and N sense lines $SL_1$ to $SL_N$. Capacitors $C_{11}$ to $C_{MN}$ having electrostatic capacitances $C_{11}$ to $C_{MN}$, respectively, are disposed in locations at intersections between the drive lines $DL_1$ to $DL_M$ and the sense lines $SL_1$ to $SL_N$.

The touch panel controller 1 includes a capacitor drive portion 5. The capacitor drive portion 5 drives M drive lines $DL_1$ to $DL_M$ in parallel with each other in accordance with a code sequence D having K M-dimensional vectors, thereby causing K first linear sum signals based on electric charges on the capacitors $C_{11}$ to $C_{MN}$ to be outputted through N sense lines $SL_1$ to $SL_N$.

In this manner, the capacitors $C_{11}$ to $C_{MN}$ are driven by the capacitor drive portion 5, which is connected to the drive lines $DL_1$ to $DL_M$. The capacitor drive portion 5 receives the code sequence D including code sequences $D_1$ to $D_4$ between which there is a low cross-correlation. When the code is "1", the capacitor drive portion 5 applies a voltage $V_{drive}$ to a corresponding drive line. When the code is "-1", the capacitor drive portion 5 applies a voltage $-V_{drive}$ to a corresponding drive line.

The touch panel controller 1 is provided with a multiplying portion 2. The multiplying portion 2 performs multiplication of the K first linear sum signals by the code sequence E having K N-dimensional vectors to obtain K signals, and then performs addition of the K signals to generate a second linear sum signal. The code sequence E includes code sequences $E_1$ to $E_4$.

The multiplying portion 2 includes a code multiplying portion 8 and an amplifying portion 9. The K first linear sum signals based on electric charges on the capacitors $C_{11}$ to $C_{MN}$, which signals are outputted through the sense lines $SL_1$ to $SL_N$, are given via the code multiplying portion 8 to the amplifying portion 9. The code multiplying portion 8 receives code sequences $E_1$ to $E_N$ between which there is a low cross-correlation. When the code is "1", the code multiplying portion 8 causes a corresponding sense line to be coupled to a non-inverting input terminal provided in an operational amplifier 10 of the amplifying portion 9. When the code is "−1", the code multiplying portion 8 causes a corresponding sense line to be coupled to an inverting input terminal of the operational amplifier 10.

Figure 2:
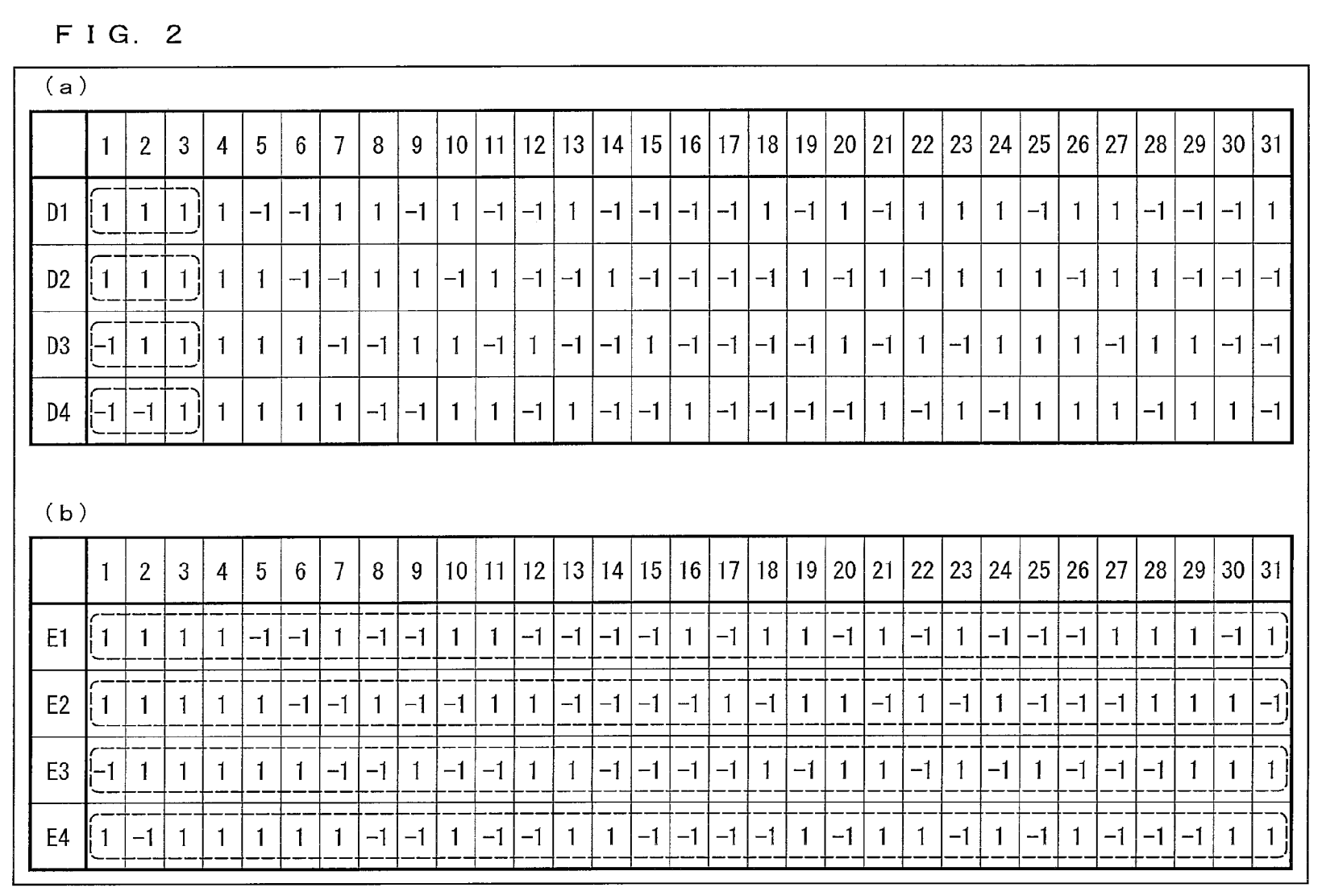

For simplicity, assuming that four sense lines and four drive lines are provided and that a sequence length of each of the code sequences is 31, examples of the code sequences $D_1$ to $D_4$ given to the capacitor drive portion 5 and the code sequences $E_1$ to $E_4$ given to the code multiplying portion 8 are shown in (a) and (b) of FIG. 2.

Structure of the Code Sequence (a) of FIG. 2 is a diagram showing the code sequences $D_1$ to $D_4$ for causing the capacitors $C_{11}$ to $C_{MN}$ to be driven by the capacitor drive portion 5, and (b) of FIG. 2 is a diagram showing the code sequences $E_1$ to $E_4$ by which the code multiplying portion 8 multiplies the linear sum signals based on electric charges on the capacitors $C_{11}$ to $C_{MN}$.

The code sequences $D_1$ to $D_4$ each have a sequence length of 31 and have a value of 1 or −1. Also, the code sequences $E_1$ to $E_4$ each have a sequence length of 31 and have a value of 1 or −1.

Figure 3:
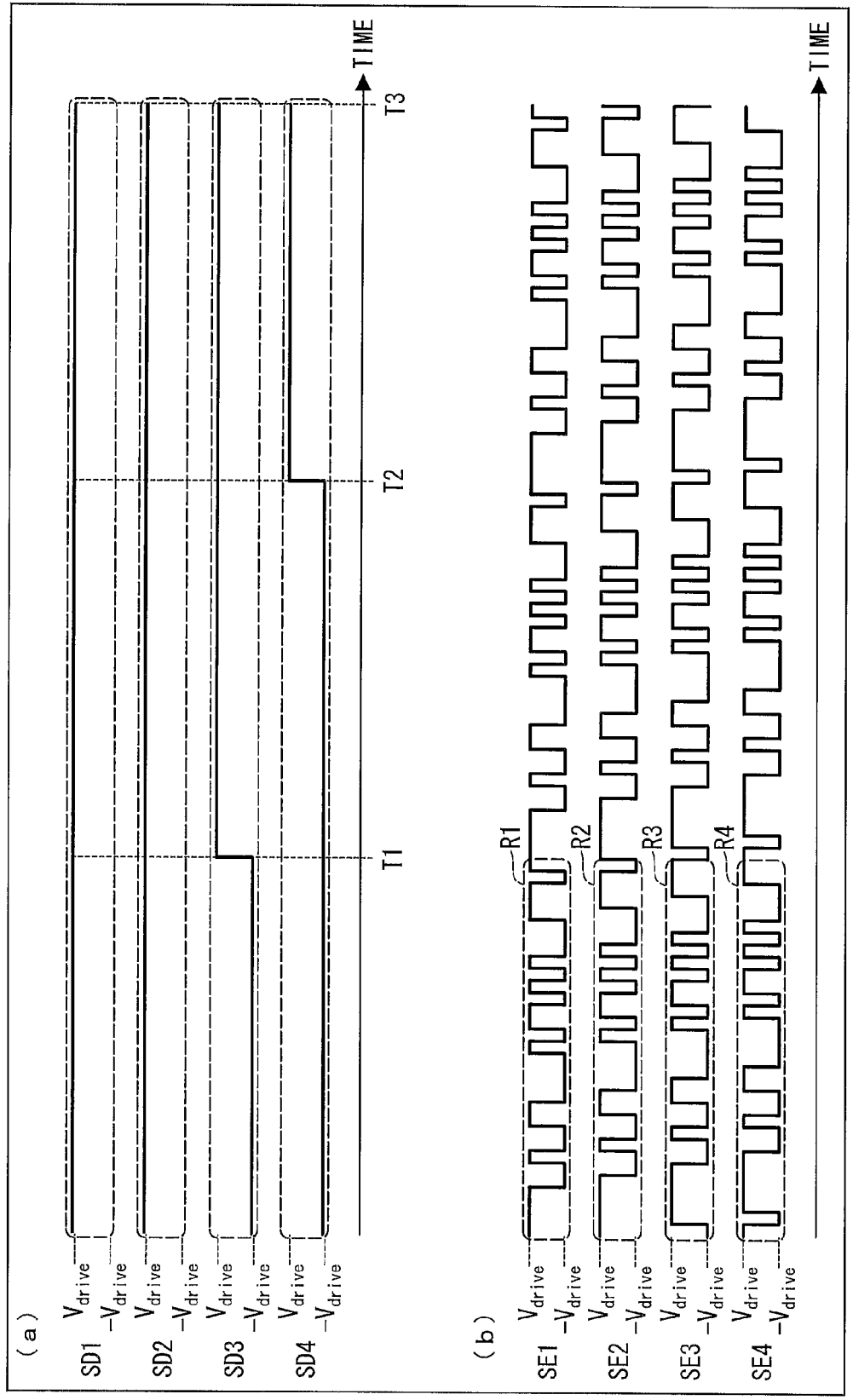
FIG. 3(a) of FIG. 3 is a chart showing time waveforms of the code sequences for causing the capacitors to be driven, and (b) of FIG. 3 is a chart showing time waveforms of the code sequences by which the linear sum signals are multiplied.

(a) of FIG. 3 is a chart showing time waveforms of the code sequences $D_1$ to $D_4$ for causing the capacitors $C_{11}$ to $C_{MN}$ to be driven, and (b) of FIG. 3 is a chart showing time waveforms of the code sequences $E_1$ to $E_4$ by which the linear sum signals are multiplied.

In (a) of FIG. 3, a time variation of a signal SD1 corresponds to change of first to third codes (1, 1, 1) of the code sequence $D_1$, and a time variation of a signal SD2 corresponds to change of first to third codes (1, 1, 1) of the code sequence $D_2$. A time variation of a signal SD3 corresponds to change of first to third codes (−1, 1, 1) of the code sequence $D_3$, and a time variation of a signal SD4 corresponds to change of first to third codes (−1, −1, 1) of the code sequence $D_4$.

In (b) of FIG. 3, a time variation of a region R1, which is a portion of a signal SE1, corresponds to change of first to 31st codes (1, 1, 1, . . . ) of the code sequence $E_1$, and a time variation of a region R2, which is a portion of a signal SE2, corresponds to change of first to 31st codes (1, 1, 1, . . . ) of the code sequence $E_2$. A time variation of a signal SE3 corresponds to change of first to 31st codes (−1, 1, 1, . . . ) of the code sequence $E_3$, and a time variation of a signal SE4 corresponds to change of first to 31st codes (1, −1, 1, . . . ) of the code sequence $E_4$.

The code sequences $E_1$ to $E_4$ corresponding to the signals SE1 to SE4 are higher in rate than the code sequences $D_1$ to $D_4$ corresponding to the signals SD1 to SD4, and a period (for example, time T1 to time T2 in (a) of FIG. 3) in which the code sequences $D_1$ to $D_4$ corresponding to the signals SD1 to SD4 change their values once is equivalent to one period of the code sequences $E_1$ to $E_4$ corresponding to the signals SE1 to SE4.

An output signal Y of the amplifying portion 9 is given by the following (Exp. 5):

[Math. 1]

$$Y = \frac{\sum_i \sum_j V_{drive} C_{ij} D_i E_j}{C_{int}} \quad \text{(Exp. 5)}$$

Here, an inner product of one period of the code $E_j$ is calculated. Assuming that cross-correlation between the codes $E_j$ is zero, the output signal Y is given by the following (Exp. 6):

[Math. 2]

$$\begin{bmatrix} \frac{1}{T_E} \int \frac{V_{drive}}{C_{int}} \sum_i \sum_j C_{ij} D_i E_j E_1 dt \\ \frac{1}{T_E} \int \frac{V_{drive}}{C_{int}} \sum_i \sum_j C_{ij} D_i E_j E_2 dt \\ \frac{1}{T_E} \int \frac{V_{drive}}{C_{int}} \sum_i \sum_j C_{ij} D_i E_j E_3 dt \\ \frac{1}{T_E} \int \frac{V_{drive}}{C_{int}} \sum_i \sum_j C_{ij} D_i E_j E_4 dt \end{bmatrix} = \begin{bmatrix} \frac{V_{drive}}{C_{int}} \sum_i C_{i1} D_i \\ \frac{V_{drive}}{C_{int}} \sum_i C_{i2} D_i \\ \frac{V_{drive}}{C_{int}} \sum_i C_{i3} D_i \\ \frac{V_{drive}}{C_{int}} \sum_i C_{i4} D_i \end{bmatrix} \quad \text{(Exp. 6)}$$

where $T_E$ is a period of the code sequence E. Next, an inner product of this signal and one period of the code $D_j$ is, assuming that cross-correlation between the codes $D_j$ is zero, given by the following (Exp. 7):

[Math. 3]

$$\frac{V_{drive}}{T_D C_{int}} \begin{bmatrix} \int \sum_i C_{i1} D_i D_1 dt & \int \sum_i C_{i1} D_i D_2 dt & \int \sum_i C_{i1} D_i D_3 dt & \int \sum_i C_{i1} D_i D_4 dt \\ \int \sum_i C_{i2} D_i D_1 dt & \int \sum_i C_{i2} D_i D_2 dt & \int \sum_i C_{i2} D_i D_3 dt & \int \sum_i C_{i2} D_i D_4 dt \\ \int \sum_i C_{i3} D_i D_1 dt & \int \sum_i C_{i3} D_i D_2 dt & \int \sum_i C_{i3} D_i D_3 dt & \int \sum_i C_{i3} D_i D_4 dt \\ \int \sum_i C_{i4} D_i D_1 dt & \int \sum_i C_{i4} D_i D_2 dt & \int \sum_i C_{i4} D_i D_3 dt & \int \sum_i C_{i4} D_i D_4 dt \end{bmatrix} = \quad \text{(Exp. 7)}$$

$$\frac{V_{drive}}{C_{int}} \begin{bmatrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{bmatrix}$$

where $T_D$ is a period of the code sequence D. In this manner, it is possible to estimate the values on the capacitors provided in the touch panel.

Embodiment 2

Configuration of Touch Panel Device 7A

Figure 4:
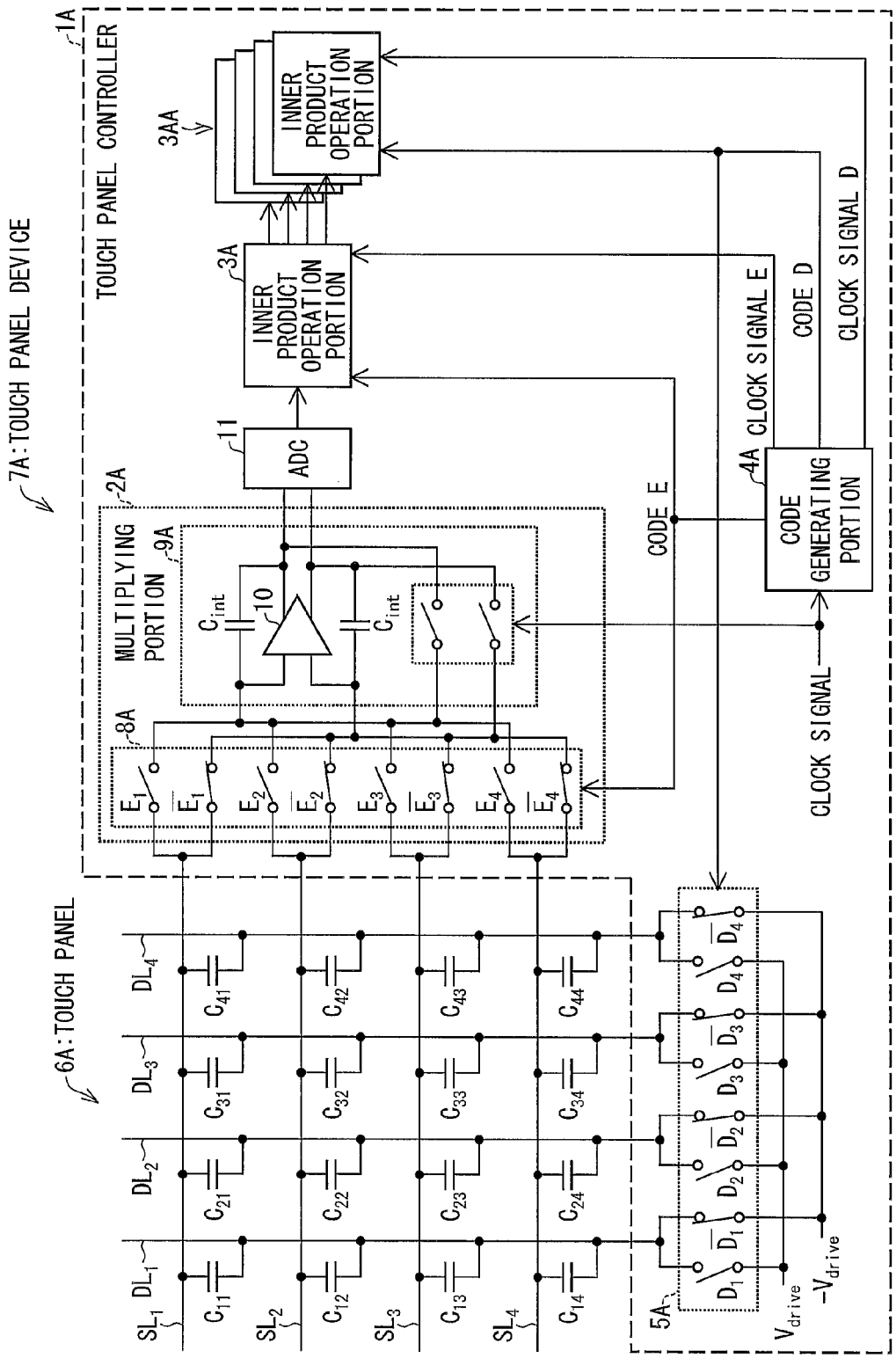
FIG. 4 is a circuit diagram showing a configuration of a touch panel device in accordance with Embodiment 2.
Figure 5:
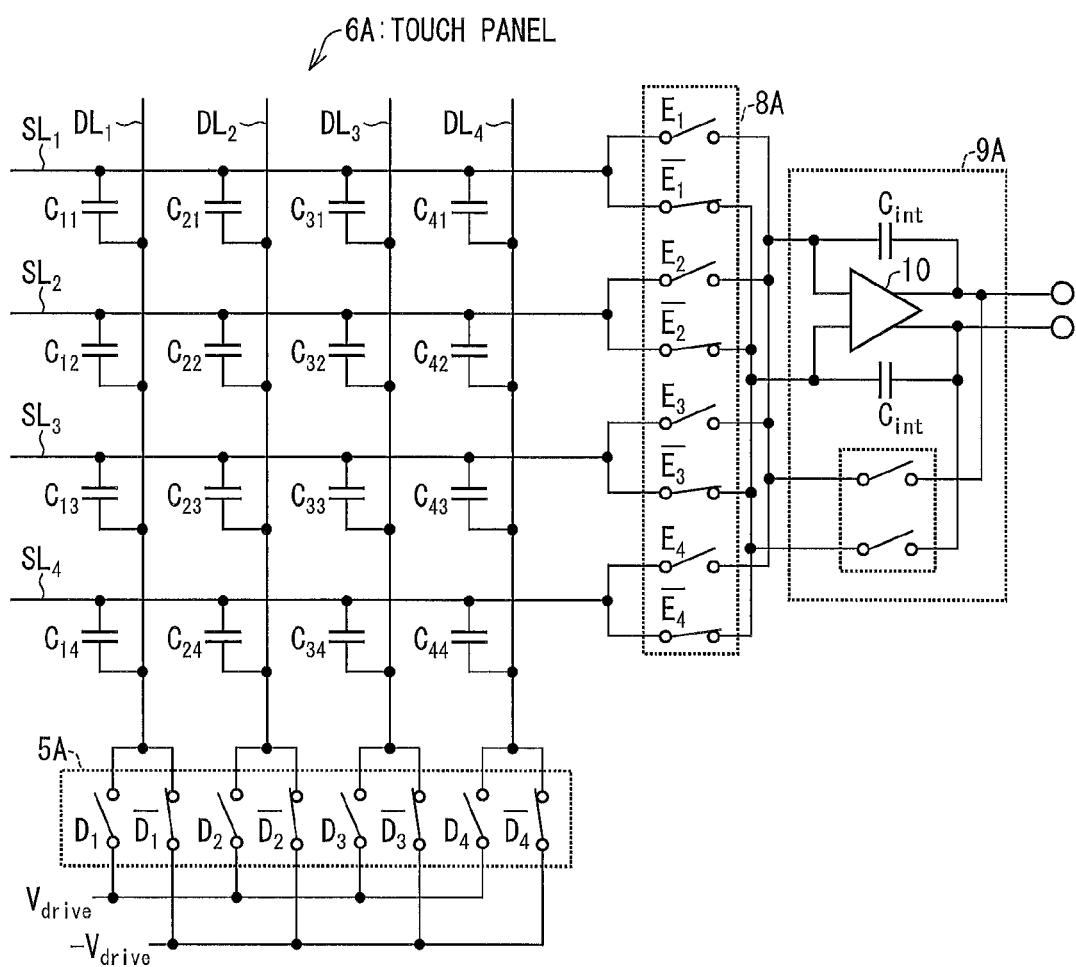
FIG. 5 is a diagram showing a main part of the touch panel device.

FIG. 4 is a circuit diagram showing a configuration of a touch panel device 7A in accordance with Embodiment 2. FIG. 5 is a diagram showing a main part of the touch panel device 7A. The touch panel device 7A is an embodiment based on the assumptions that four sense lines and four drive lines are provided and that a sequence length of each code sequence is 31.

The touch panel device 7A includes a touch panel 6A and a touch panel controller 1A. The touch panel 6A has four drive lines $DL_1$ to $DL_4$ and four sense lines $SL_1$ to $SL_4$. Capacitors $C_{11}$ to $C_{44}$ having electrostatic capacitances $C_{11}$ to $C_{44}$, respectively, are disposed in locations at intersections between the drive lines $DL_1$ to $DL_4$ and the sense lines $SL_1$ to $SL_4$.

The touch panel controller 1A includes a code generating portion 4A. The code generating portion 4A generates a code sequence D having 31 four-dimensional vectors in accordance with a clock signal and then feeds the code sequence D thus generated to a capacitor drive portion 5A.

The capacitor drive portion 5A drives the four drive lines $DL_1$ to $DL_4$ in parallel with each other on the basis of the code sequence D fed from the code generating portion 4A, the code sequence D having 31 four-dimensional vectors, thereby causing 31 first linear sum signals based on electric charges on the capacitors $C_{11}$ to $C_{44}$ to be outputted through the four sense lines $SL_1$ to $SL_4$. The code sequence D includes the code sequences $D_1$ to $D_4$ shown in (a) of FIG. 2.

The touch panel controller 1A is provided with a multiplying portion 2A. The multiplying portion 2A performs multiplication of the 31 first linear sum signals by the code sequence E, generated by the code generating portion 4A, having 31 four-dimensional vectors to obtain 31 signals, performs addition of the 31 signals to generate the second linear sum signal, and then feeds the second linear sum signal to the AD converter 11. The code sequence E includes the code sequences $E_1$ to $E_4$ shown in (b) of FIG. 2.

The multiplying portion 2A includes a code multiplying portion 8A and an amplifying portion 9A. The 31 first linear sum signals based on electric charges on the capacitors $C_{11}$ to $C_{44}$, which signals are outputted through the sense lines $SL_1$ to $SL_4$, are given via the code multiplying portion 8A to the amplifying portion 9A. The code multiplying portion 8A receives code sequences $E_1$ to $E_4$ between which there is a low cross-correlation. When the code is "1", the code multiplying portion 8A causes a corresponding sense line to be coupled to a non-inverting input terminal provided in an operational amplifier 10 of the amplifying portion 9. When the code is "−1", the code multiplying portion 8A causes a corresponding sense line to be coupled to an inverting input terminal of the operational amplifier 10.

An AD converter 11 AD-converts the second linear sum signal, which is fed from the multiplying portion 2A, and then the AD-converted second linear sum signal to an inner product operation portion 3A. The inner product operation portion 3A calculates, in accordance with a clock signal E generated by the code generating portion 4A, an inner product of the second linear sum signal AD-converted by the AD converter 11 and the code sequence E generated by the code generating portion 4A to thereby generate a first inner product operation signal, and then feeds the first inner product operation signal thus generated to any one of inner product operation portions 3AA.

The inner product operation portion 3AA calculates, in accordance with a clock D generated by the code generating portion 4A, an inner product of the first inner product operation signal generated by the inner product operation portion 3A and the code sequence D generated by the code generating portion 4A to thereby generate a second inner product operation signal.

Configuration of Code Generating Portion 4A

Figure 6:
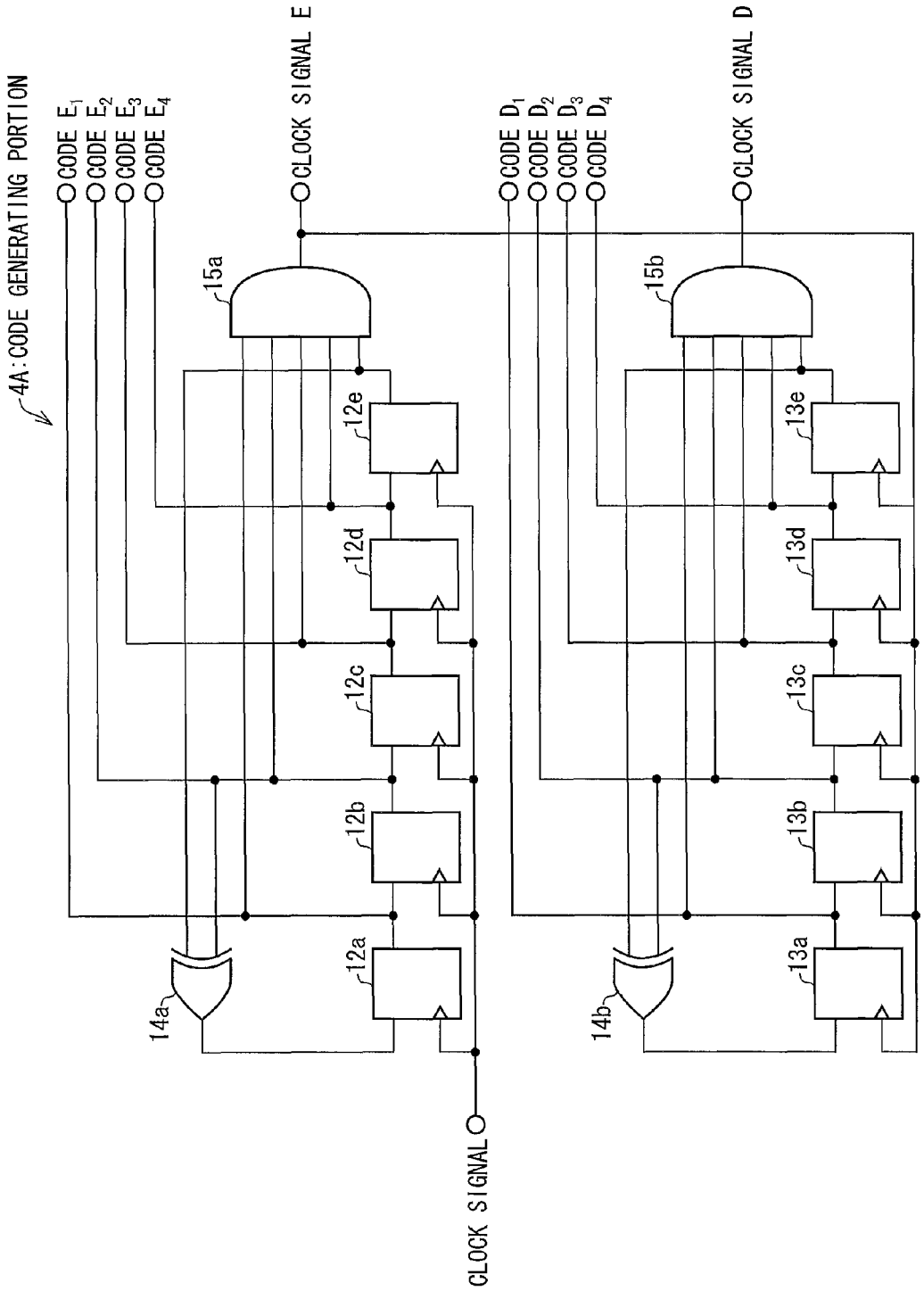
FIG. 6 is a diagram showing a configuration of a code generating portion provided in the touch panel device.

FIG. 6 is a diagram showing a configuration of the code generating portion 4A provided in the touch panel device 7A. The code generating portion 4A generates (i) the code sequence D to be given to the capacitor drive portion 5A and (ii) generates the code sequence E to be given to the code multiplying portion 8A. The code sequences D and E are each M-sequence-based code sequence.

The code generating portion 4A includes shift registers $12a$ to $12e$ connected in series. To the shift registers $12a$ to $12e$, a clock signal is inputted.

The code generating portion 4A is provided with a clock generating portion $15a$. The clock generating portion $15a$ generates a clock signal E based on the code sequence $E_1$ generated by the shift register $12a$, the code sequence $E_2$ generated by the shift register $12b$, the code sequence $E_3$ generated by the shift register $12c$, and the code sequence $E_4$ generated by the shift register $12d$, and a code sequence generated by the shift register $12e$.

The code generating portion 4A includes a XOR gate $14a$. The XOR gate $14a$ generates a signal based on the code sequence $E_2$ generated by the shift register $12b$ and the code sequence generated by the shift register $12e$, and then feeds the signal thus generated to the shift register $12a$.

The code generating portion 4A has shift registers $13a$ to $13e$ connected in series. To the shift registers $13a$ to $13e$, the clock signal E generated by the clock generating portion $15a$ is inputted.

The code generating portion 4A is provided with a clock generating portion $15b$. The clock generating portion $15b$ generates a clock signal D based on the code sequence $D_1$ generated by the shift register $13a$, the code sequence $D_2$ generated by the shift register $13b$, the code sequence $D_3$ generated by the shift register $13c$, and the code sequence $D_4$ generated by the shift register $13d$, and a code sequence generated by the shift register $13e$.

The code generating portion 4A includes a XOR gate $14b$. The XOR gate $14b$ generates a signal based on the code sequence $D_2$ generated by the shift register $13b$ and the code sequence generated by the shift register $13e$, and then feeds the signal thus generated to the shift register $13a$.

In this manner, the five shift registers $12a$ to $12e$ makes up a first linear feedback shift register to cause the output signals from the shift registers $12b$ and $12e$ to be fed back into the input of the shift register $12a$ via the XOR gate $14a$. The clock signal given to the shift registers $12a$ to $12e$ is inputted externally.

In the present embodiment, the code sequences generated by the first linear feedback shift registers $12a$ to $12e$ are used as the code sequences $E_1$ to $E_4$. In this case, periods of the code sequences $E_1$ to $E_4$ are 31 times longer than a period of the clock signal.

The clock generating portion $15a$ shown in FIG. 6 outputs 1 when the output values from all of the first linear feedback shift registers $12a$ to $12e$ are 1, and outputs 0 otherwise. This generates a clock (clock signal E) for use in updating of values of the code sequence E for each single period of the code sequence E.

In the present embodiment, the second linear feedback shift registers 13a to 13e configured similarly generate the code sequences $D_1$ to $D_4$. The second linear feedback shift registers 13a to 13e each update values of the code sequence E for each single period of the code sequence E.

In this case, a period of the code sequence D is 31 times longer than the period of the code sequence E and is therefore 961 times (31×31) longer than the period of the clock signal given to the code generating portion 4A. The second linear feedback shift registers 13a to 13e are also connected to the clock generating portion 15b, which generates a clock (clock signal D) equivalent to one period of the code sequence D.

Configuration of the Inner Product Operation Portion 3A

Figure 7:
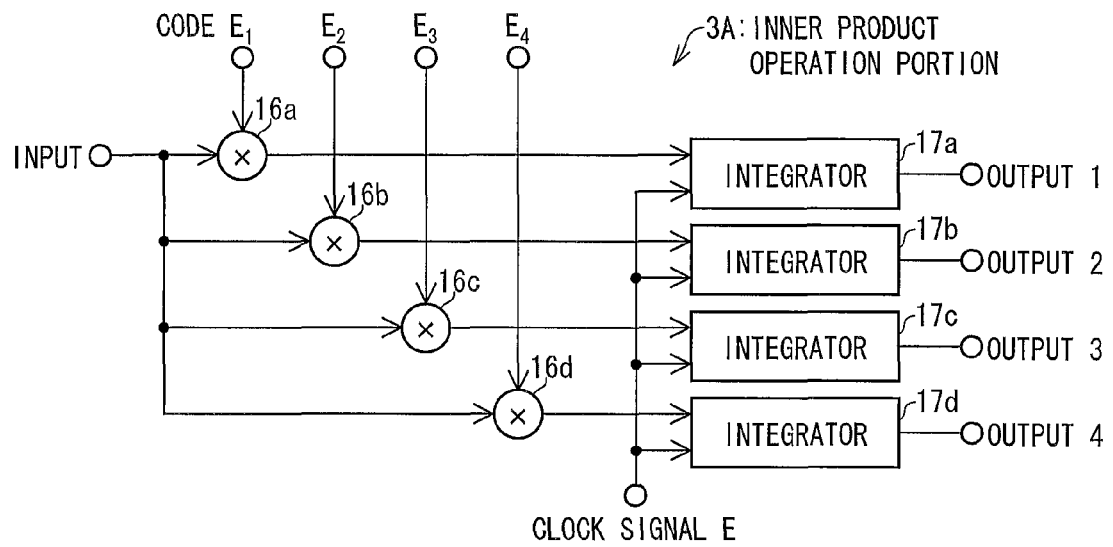
FIG. 7 is a diagram showing a configuration of an inner product operation portion provided in the touch panel device.

FIG. 7 is a diagram showing a configuration of an inner product operation portion 3A provided in the touch panel device 7A. The inner product operation portion 3A has multipliers 16a to 16d and integrators 17a to 17d. The multiplier 16a generates a signal by multiplying the second linear sum signal, which is fed by the ADC 11, by the code sequence $E_1$ and then feeds the signal thus generated to the integrator 17a. The integrator 17a generates a signal by integrating the signal fed by the multiplier 16a in accordance with the clock signal E and then outputs the signal thus generated to any one of the inner product operation portions 3AA. The multiplier 16b generates a signal by multiplying the second linear sum signal, which is fed by the ADC 11, by the code sequence $E_2$ and then feeds the signal thus generated to the integrator 17b. The integrator 17b generates a signal by integrating the signal fed by the multiplier 16b in accordance with the clock signal E and then outputs the signal thus generated to other one of the inner product operation portions 3AA.

The multiplier 16c generates a signal by multiplying the second linear sum signal, which is fed by the ADC 11, by the code sequence $E_3$ and then feeds the signal thus generated to the integrator 17c. The integrator 17c generates a signal by integrating the signal fed by the multiplier 16c in accordance with the clock signal E and then outputs the signal thus generated to still other one of the inner product operation portions 3AA. The multiplier 16d generates a signal by multiplying the second linear sum signal, which is fed by the ADC 11, by the code sequence $E_4$ and then feeds the signal thus generated to the integrator 17d. The integrator 17d generates a signal by integrating the signal fed by the multiplier 16d in accordance with the clock signal E and then outputs the signal thus generated to the other one of the inner product operation portions 3AA.

In this manner, the inner product operation circuit 3A calculates an inner product of the code sequence E and the second linear sum signal. The signals obtained by the multipliers 16a to 16d multiplying the second linear sum signal by the code sequence E are integrated over one period of the code sequence E. In order to achieve the integration over one period of the code sequence E, the integrators 17a to 17d are reset by the clocks (clock signal E, clock signal D) generated by the clock generating portions 15a and 15b, which are shown in FIG. 6.

The drive lines $DL_1$ to $DL_4$ of the touch panel 6A are driven by the code sequences $D_1$ to $D_4$ generated by the code generating portion 4A shown in FIG. 6, and the signals based on electric charges on the capacitors $C_{11}$ to $C_{44}$ of the touch panel 6A are added by using the amplifying portion 9A in which the operational amplifier 10 is included. The addition is performed by an integrator using the operational amplifier 10. The addition is achieved by resetting a capacitor $C_{int}$ of the integrator for each one clock cycle.

Depending upon the code sequences $E_1$ to $E_4$, the sense lines $SL_1$ to $SL_4$ corresponding to the capacitors $C_{11}$ to $C_{44}$ of the touch panel 6A are coupled to the inverting input terminal or the non-inverting input terminal of the operational amplifier 10. In the present embodiment, the AD converter 11 converts the output signal from the operational amplifier 10 into a digital signal, and the inner product operation portion 3A, shown in FIG. 7, mounted in a form of a digital circuit calculates inner products of the digital signal into which the output signal from the operational amplifier 10 is converted and the code sequences $E_1$ to $E_4$ generated by the code generating portion 4A.

As reset signals necessary for the inner product operation portion 3A, the clock signal $E_1$ to $E_4$ generated by the code generating portion 4A are used. The inner product operation portion 3A is coupled to the inner product operation portions 3AA. The inner product operation portions 3AA uses (i) the output signal from the inner product operation portion 3A and (ii) the code sequences $D_1$ to $D_4$ generated by the code generating portion 4A. As a reset signal necessary for the inner product operation portion 3AA, the clock signal D generated by the code generating portion 4A is used.

Here, consider a case where a touch input is made in a location in the vicinity of the intersection between the sense line $SL_1$ and the drive line $DL_1$ and in the vicinity of the intersection between the sense line $SL_2$ and the drive line $DL_2$. Assume that the electrostatic capacitances of the touch panel are given by the following (Exp. 8):

[Math. 4]

$$\begin{bmatrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{bmatrix} = \begin{bmatrix} 0.54 & 0.04 & 0.04 & 0.04 \\ 0.04 & 0.24 & 0.04 & 0.04 \\ 0.04 & 0.04 & 0.04 & 0.04 \\ 0.04 & 0.04 & 0.04 & 0.04 \end{bmatrix} \text{pF} \quad \text{(Exp. 8)}$$

Further, assume that Chat is 0.2 pF and that $V_{drive}$, is 1V. In this case, a capacitance pattern obtained by the circuit shown in FIG. 4 is one as given by the following (Exp. 9):

[Math. 5]

$$\begin{bmatrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{bmatrix} = \begin{bmatrix} 0.5330 & 0.0100 & 0.0167 & 0.0167 \\ 0.0100 & 0.2334 & 0.0267 & 0.0267 \\ 0.0167 & 0.0267 & 0.0334 & 0.0334 \\ 0.0167 & 0.0267 & 0.0334 & 0.0334 \end{bmatrix} \text{pF} \quad \text{(Exp. 9)}$$

Since a cross-correlation value of the code sequences as used in the present embodiment is not zero, some error in electrostatic capacitance develops. However, electrostatic capacitances $C_{11}$ and $C_{22}$ are higher than the other electrostatic capacitances. This means that the touch input is successfully detected.

Embodiment 3

Configuration of the Touch Panel Device 7B

Figure 8:
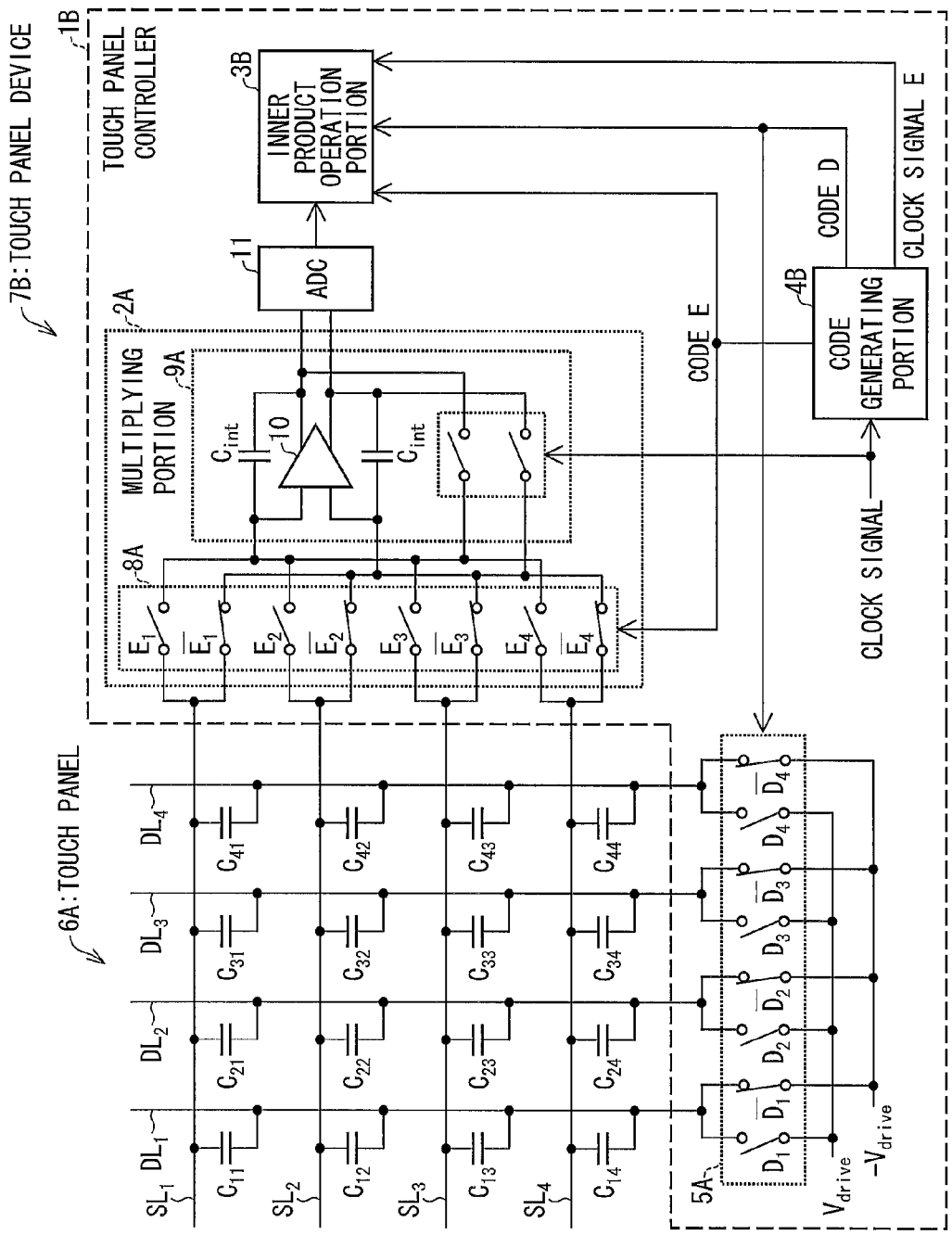
FIG. 8 is a circuit diagram showing a configuration of a touch panel device in accordance with Embodiment 3.

FIG. 8 is a circuit diagram showing a configuration of a touch panel device 7B in accordance with Embodiment 3.

Constituent elements which are the same as those described above are given the same reference signs. Detailed explanation of these constituent elements is therefore omitted.

The touch panel device 7B includes a touch panel controller 1B. The touch panel controller 1B has an inner product operation portion 3B. The inner product operation portion 3B calculates an inner product of (i) a signal obtained by multiplying the second linear sum signal fed by the AD converter 11 by the code sequence E or the code sequence D and (ii) the code sequence D or the code sequence E, to generates an inner product operation signal for estimating the values on the capacitors $C_{11}$ to $C_{44}$.

Configuration of the Code Generating Portion 4B

Figure 9:
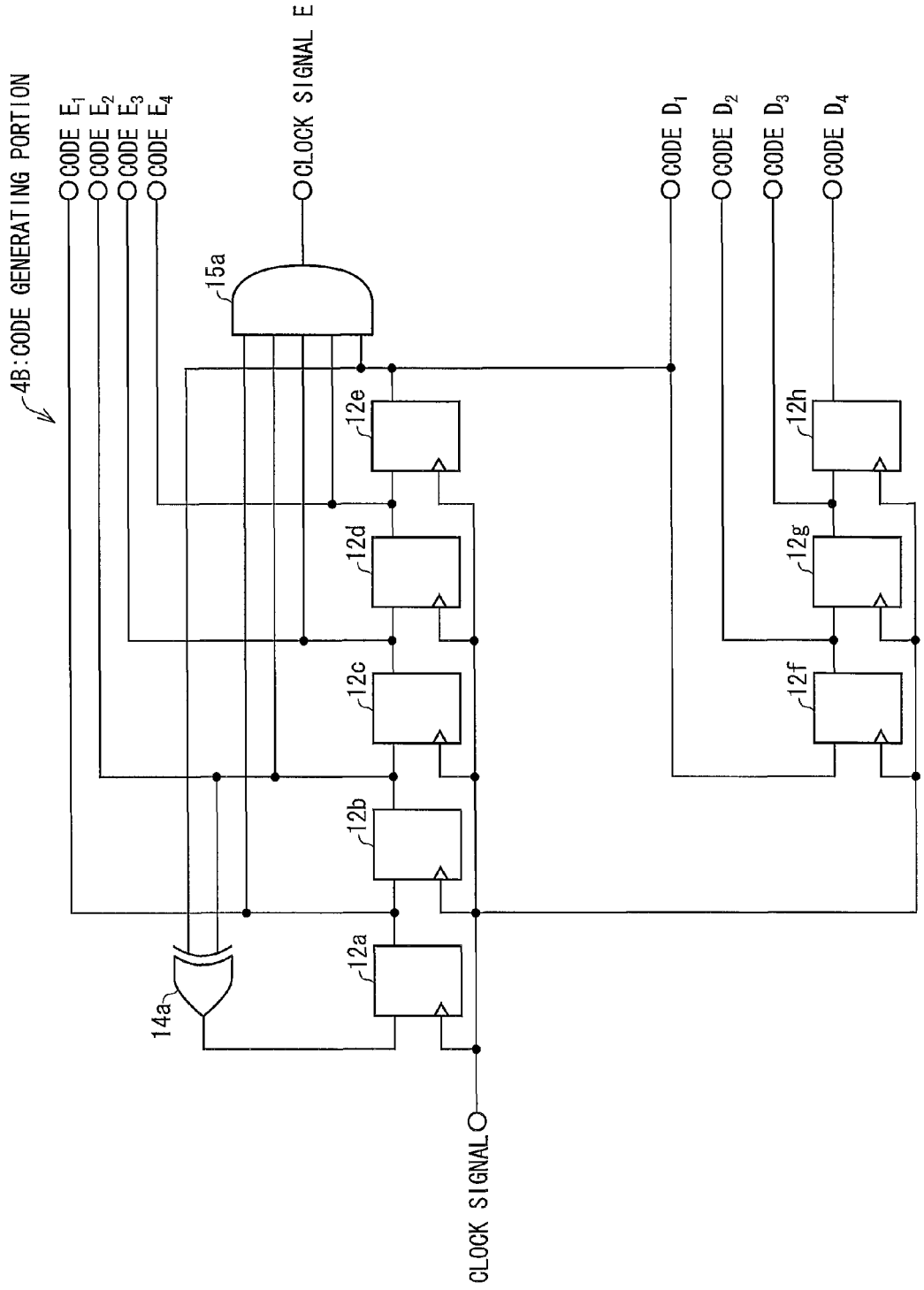
FIG. 9 is a diagram showing a configuration of a code generating portion provided in the touch panel device.

FIG. 9 is a diagram showing a configuration of a code generating portion 4B provided in the touch panel device 7B. Constituent elements which are the same as those described above are given the same reference signs. Detailed explanation of these constituent elements is therefore omitted.

The code generating portion 4B has shift registers $12f$ to $12h$ connected in series. To the shift registers $12f$ to $12h$, a clock signal is inputted. To the shift register $12f$, an output signal from the shift register $12e$ is inputted.

The output signal from the shift register $12e$, an output signal from the shift register $12f$, an output signal from the shift register $12g$, and an output signal from the shift register $12h$ correspond to the code sequences $D_1$ to $D_4$, respectively.

In the present embodiment, M-sequence-based code sequences generated by the linear feedback shift registers are used. The five shift registers $12a$ to $12e$ makes up a first linear feedback shift register to cause the output signals from the shift registers $12b$ and $12e$ to be fed back into the input of the shift register $12a$ via the XOR gate $14a$.

Further, shift registers $12f$ to $12h$ are provided so as to be connected in cascade, wherein their inputs are the output signal from the shift register $12e$. The clock signal given to the shift registers $12a$ to $12h$ is inputted from outside of the code generating portion 4B. The clock generating portion $15a$ outputs 1 when the output values from all of the shift registers of the linear feedback shift registers $12a$ to $12e$, and outputs 0 otherwise.

In the present embodiment, the output signals from the shift registers $12a$ to $12d$ are used as the code sequences $E_1$ to $E_4$, and the output signals from the shift registers $12e$ to $12h$ are used as the code sequences $D_1$ to $D_4$.

Increasing the number of sense lines or drive lines can be achieved by increasing the number of shift registers connected in cascade. This makes it possible to increase the number of code sequences.

Configuration of the Inner Product Operation Portion 3B

Figure 10:
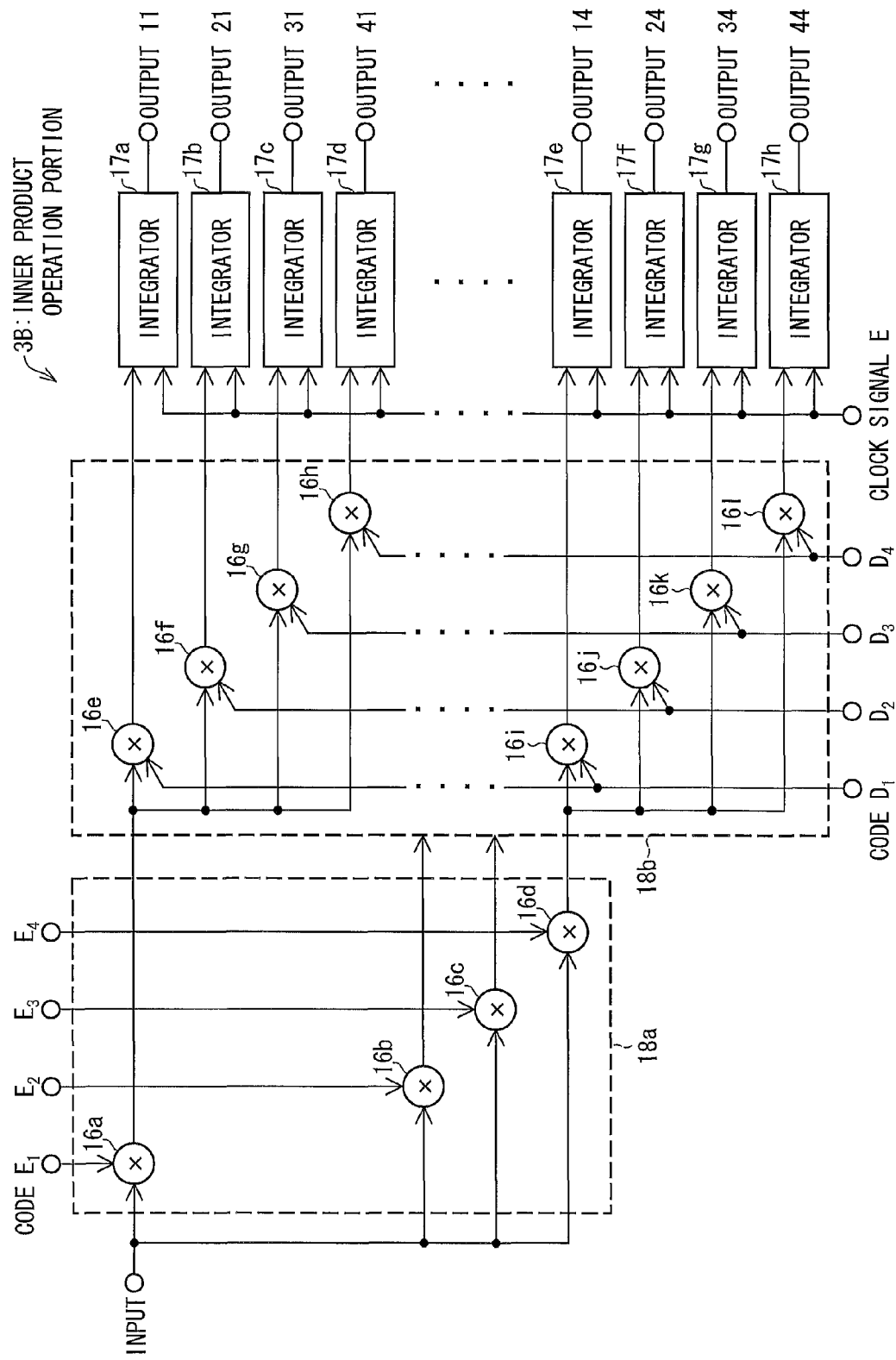
FIG. 10 is a diagram showing a configuration of an inner product operation portion provided in the touch panel device.

FIG. 10 is a diagram showing a configuration of an inner product operation portion 3B provided in the touch panel device 7B. Constituent elements which are the same as those described above are given the same reference signs. Detailed explanation of these constituent elements is therefore omitted.

The inner product operation portion 3B has code sequence multiplying portions $18a$ and $18b$. The code sequence multiplying portion $18a$ has multipliers $16a$ to $16d$. The multiplier $16a$ multiplies the second linear sum signal fed by the ADC 11 by the code sequence $E_1$ and then feeds an output to the multipliers $16e$, $16f$, $16g$, and $16h$ of the code sequence multiplying portion $18b$. The multiplier $16b$ multiplies the second linear sum signal fed by the ADC 11 by the code sequence $E_2$ and then feeds an output to the multipliers of the code sequence multiplying portion $18b$. The multiplier $16c$ multiplies the second linear sum signal fed by the ADC 11 by the code sequence $E_3$ and then feeds an output to the multipliers of the code sequence multiplying portion $18b$. The multiplier $16d$ multiplies the second linear sum signal fed by the ADC 11 by the code sequence $E_4$ and then feeds an output to the multipliers $16i$, $16j$, $16k$, and $16l$ of the code sequence multiplying portion $18b$.

The multiplier $16e$ multiplies the output from the multiplier $16a$ by the code sequence $D_1$ and then feeds an output to the integrator $17a$. The multiplier $16f$ multiplies the output from the multiplier $16a$ by the code sequence $D_2$ and then feeds an output to the integrator $17b$. The multiplier $16g$ multiplies the output from the multiplier $16a$ by the code sequence $D_3$ and then feeds an output to the integrator $17c$. The multiplier $16h$ multiplies the output from the multiplier $16a$ by the code sequence $D_4$ and then feeds an output to the integrator $17d$.

The multiplier $16i$ multiplies the output from the multiplier $16d$ by the code sequence $D_1$ and then feeds an output to the integrator $17e$. The multiplier $16j$ multiplies the output from the multiplier $16d$ by the code sequence $D_2$ and then feeds an output to the integrator $17f$. The multiplier $16k$ multiplies the output from the multiplier $16d$ by the code sequence $D_3$ and then feeds an output to the integrator $17g$. The multiplier $16l$ multiplies the output from the multiplier $16d$ by the code sequence $D_4$ and then feeds an output to the integrator $17h$.

The integrator $17a$ integrates the output from the multiplier $16e$ in accordance with the clock signal E. The integrator $17b$ integrates the output from the multiplier $16f$ in accordance with the clock signal E. The integrator $17c$ integrates the output from the multiplier $16g$ in accordance with the clock signal E. The integrator $17d$ integrates the output from the multiplier $16h$ in accordance with the clock signal E.

The integrator $17e$ integrates the output from the multiplier $16i$ in accordance with the clock signal E. The integrator $17f$ integrates the output from the multiplier $16j$ in accordance with the clock signal E. The integrator $17g$ integrates the output from the multiplier $16k$ in accordance with the clock signal E. The integrator $17h$ integrates the output from the multiplier $16l$ in accordance with the clock signal E.

As described above, the inner product operation portion 3B includes: the code sequence multiplying portion $18a$ configured to multiply the incoming signal from the ADC 11 by the code sequences $E_1$ to $E_4$; and the code sequence multiplying portion $18b$ configured to multiply the incoming signal, i.e. the output signal from the code sequence multiplying portion $18a$, by the code sequences $D_1$ to $D_4$, and the output signal from the code sequence multiplying portion $18b$ is integrated over one period of the code sequence E or D. As a reset signal for the integrators $17a$ to $17h$, the clock signal E outputted by the code generating portion 4B in FIG. 9 is used.

The following will describe the touch panel device 7B shown in FIG. 8. The capacitors $C_{11}$ to $C_{44}$ of the touch panel 6A are driven by the code sequences $D_1$ to $D_4$ generated by the code generating portion 4B shown in FIG. 9, and electric charges on the capacitors $C_{11}$ to $C_{44}$ are added by using the multiplying portion 2 in which the amplifying portion 9A is included. The addition of the signals is realized by the amplifying portion 9A using the operational amplifier 10 and by resetting a capacitor Chat of the integrator for each one clock cycle.

Depending upon the code sequences $E_1$ to $E_4$, the sense lines $SL_1$ to $SL_4$ to which the signals based on electrical charges on the capacitors $C_{11}$ to $C_{44}$ are coupled to the inverting input terminal or the non-inverting input terminal of the operational amplifier 10. In the present embodiment, the AD converter 11 converts the output signal from the operational amplifier 10 into a digital signal, and the inner product operation portion 3B, shown in FIG. 10, mounted in a form of a digital circuit calculates inner products of the digital signal into which the output signal from the operational amplifier 10 is converted and the code sequences $E_1$ to $E_4$ generated by the code generating portion 4B. As a reset signal necessary for the inner product operation portion 3B, the clock signal E generated by the code generating portion 4B is used.

Here, consider a case where a touch input is made in a location in the vicinity of the intersection between the sense line $SL_1$ and the drive line $DL_1$ and in the vicinity of the intersection between the sense line $SL_2$ and the drive line $DL_2$. Assume that the electrostatic capacitances of the touch panel 6A are given by the following (Exp. 10):

[Math. 6]

$$\begin{bmatrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{bmatrix} = \begin{bmatrix} 0.54 & 0.04 & 0.04 & 0.04 \\ 0.04 & 0.24 & 0.04 & 0.04 \\ 0.04 & 0.04 & 0.04 & 0.04 \\ 0.04 & 0.04 & 0.04 & 0.04 \end{bmatrix} pF \quad \text{(Exp. 10)}$$

Further, assume that Chat is 0.2 pF and that $V_{drive}$, is 1V. In this case, a capacitance pattern obtained by the circuit shown in FIG. 8 is one as given by the following (Exp. 11):

[Math. 7]

$$\begin{bmatrix} C_{11} & C_{21} & C_{31} & C_{41} \\ C_{12} & C_{22} & C_{32} & C_{42} \\ C_{13} & C_{23} & C_{33} & C_{43} \\ C_{14} & C_{24} & C_{34} & C_{44} \end{bmatrix} = \quad \text{(Exp. 11)}$$

$$\begin{bmatrix} 0.5143 & -0.0019 & -0.0019 & -0.0019 \\ -0.0020 & 0.2047 & -0.0020 & -0.0020 \\ -0.0020 & -0.0020 & -0.0020 & -0.0020 \\ -0.0019 & -0.0019 & -0.0019 & -0.0019 \end{bmatrix} pF$$

Since cross-correlation between the code sequences as used in the present embodiment is not zero, some error in electrostatic capacitance develops. However, electrostatic capacitances $C_{11}$ and $C_{22}$ are higher than the other electrostatic capacitances. This means that the touch input is successfully detected.

According to Embodiment 3, the inner product operation portion is caused to operate in accordance with only the clock signal E that has a period shorter than that of the clock signal D. This makes it possible to appropriately respond to a quick touch input.

The example has been provided above in which the inner product of (i) the signal obtained by multiplying the code sequence E by the second linear sum signal and (ii) the code sequence D is calculated. However, the present invention is not limited to this example. Alternatively, an inner product of a signal obtained by multiplying the code sequence D by the second linear sum signal and the code sequence E may be calculated.

In the present embodiment, the output signals from the shift registers 12a to 12d are used as the code sequences $E_1$ to $E_4$, and the output signals from the shift registers 12e to 12h are used as the code sequences $D_1$ to $D_4$. However, an alternative arrangement may be employed in which the output signals from the shift registers 12e to 12h are used as the code sequences $E_1$ to $E_4$, and the output signals from the shift registers 12a to 12d are used as the code sequences $D_1$ to $D_4$.

Embodiment 4

Configuration of Touch Panel Device 7C

Figure 11:
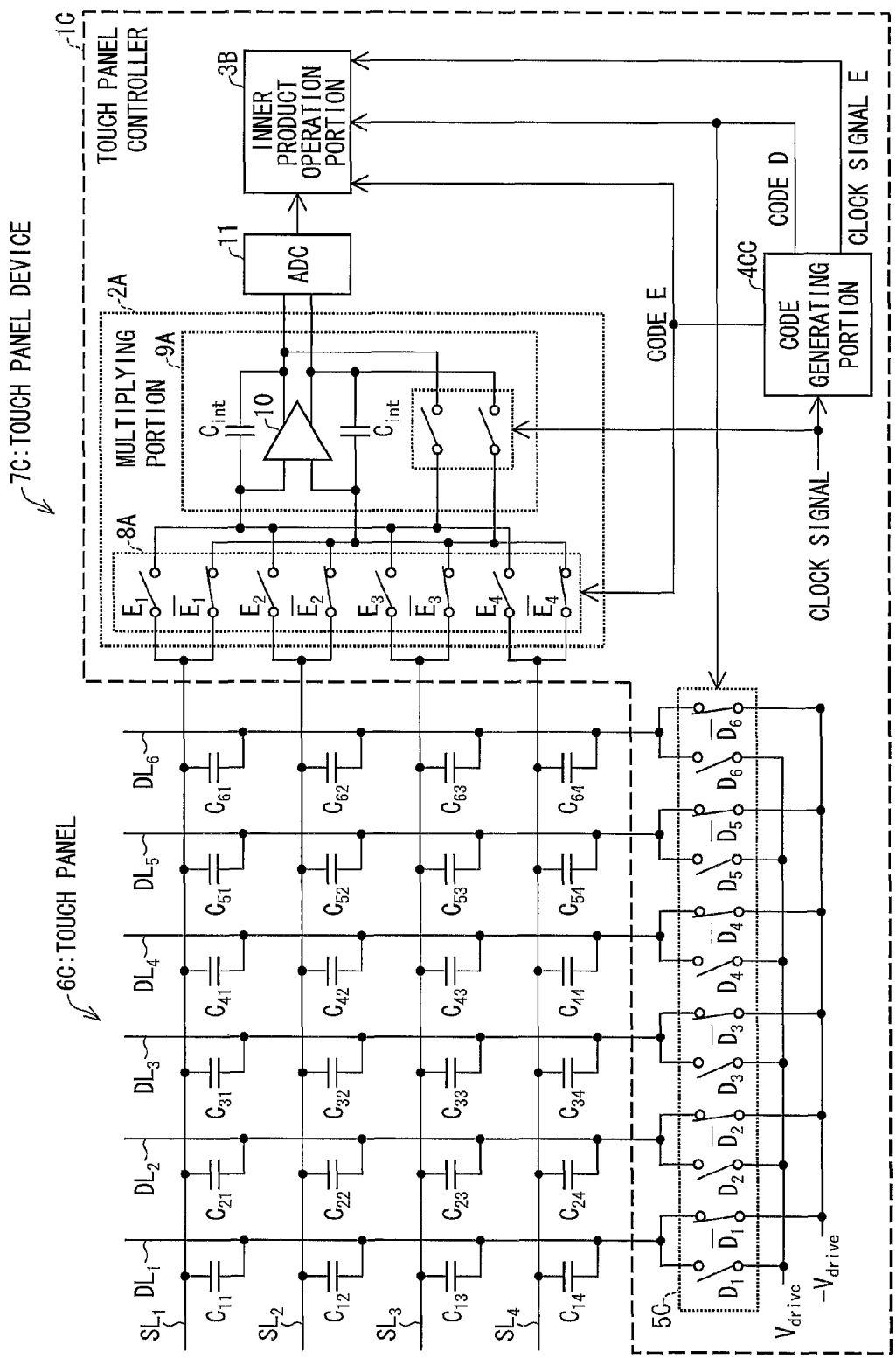
FIG. 11 is a circuit diagram showing a configuration of a touch panel device in accordance with Embodiment 4.

FIG. 11 is a circuit diagram showing a configuration of a touch panel device 7C in accordance with Embodiment 4. Constituent elements which are the same as those described above are given the same reference signs. Detailed explanation of these constituent elements is therefore omitted.

Now, consider a case where, in the touch panel device 7B described in Embodiment 3, four sense lines and six drive lines are provided.

Configuration of Code Generating Portion 4C in Accordance with Comparative Example FIG. 12 is a diagram showing a configuration of a code generating portion 4C in accordance with Comparative Example. Constituent elements which are the same as those described above are given the same reference signs. Detailed explanation of these constituent elements is therefore omitted.

The code generating portion 4C includes shift registers 12f to 12j connected in series. To the shift registers 12f to 12j, a clock signal is inputted. To the shift register 12f, an output signal from the shift register 12e is inputted.

The output signals from the shift registers 12e to 12j correspond to the code sequences $D_1$ to $D_6$, respectively.

The code generating portion 4C is different from the code generating portion 4B shown in FIG. 9 in that the code generating portion 4C further includes shift registers 12i and 12j and generates code sequences that are larger in number than those generated by the code generating portion 4B. Here, consider a case where a touch input is made in a location in the vicinity of the intersection between the sense line $SL_2$ and the drive line $DL_2$. Assume that the electrostatic capacitances of the touch panel are given by the following (Exp. 12):

[Math. 8]

$$\begin{bmatrix} C_{11} & C_{21} & C_{31} & C_{41} & C_{51} & C_{61} \\ C_{12} & C_{22} & C_{32} & C_{42} & C_{52} & C_{62} \\ C_{13} & C_{23} & C_{33} & C_{43} & C_{53} & C_{63} \\ C_{14} & C_{24} & C_{34} & C_{44} & C_{54} & C_{64} \end{bmatrix} = \quad \text{(Exp. 12)}$$

$$\begin{bmatrix} 0.04 & 0.04 & 0.04 & 0.04 & 0.04 & 0.04 \\ 0.54 & 0.04 & 0.04 & 0.04 & 0.04 & 0.04 \\ 0.04 & 0.04 & 0.04 & 0.04 & 0.04 & 0.04 \\ 0.04 & 0.04 & 0.04 & 0.04 & 0.04 & 0.04 \end{bmatrix} pF$$

In this case, a capacitance pattern obtained by the touch panel device 7C including the code generating portion 4C in place of the code generating portion 4CC is one as given by the following (Exp. 13):

[Math. 9]

$$\begin{bmatrix} C_{11} & C_{21} & C_{31} & C_{41} & C_{51} & C_{61} \\ C_{12} & C_{22} & C_{32} & C_{42} & C_{52} & C_{62} \\ C_{13} & C_{23} & C_{33} & C_{43} & C_{53} & C_{63} \\ C_{14} & C_{24} & C_{34} & C_{44} & C_{54} & C_{64} \end{bmatrix} = \begin{bmatrix} -0.0058 & -0.0058 & -0.0058 & -0.0058 & -0.0058 & -0.0058 \\ 0.5518 & -0.0058 & -0.0058 & -0.0058 & -0.0058 & 0.0355 \\ -0.0058 & -0.0058 & -0.0058 & -0.0058 & -0.0058 & -0.0058 \\ 0.0355 & -0.0058 & -0.0058 & -0.0058 & -0.0058 & -0.5518 \end{bmatrix} \text{pF} \quad \text{(Exp. 13)}$$

In the touch panel, an actual electrostatic capacitance value on the capacitor $C_{12}$ is as high as 0.5518, and the electrostatic capacitance value on the capacitor $C_{64}$ subject to the estimation is also 0.5518, which is the same as the actual electrostatic capacitance value on the capacitor $C_{12}$. This leads to a mistaken recognition of a touch input in a location in the vicinity of the intersection between the sense line $SL_4$ and the drive line $DL_6$ even in the absence of touch input in that location. Focusing on components involving the sense line capacitor $C_{12}$ and the capacitor $C_{64}$ subject to the estimation, a component appeared on the output signal of the amplifier is given by $V_{drive} \times C_{12} \times D_1 \times E_2$. With respect to this signal, an estimating portion performs calculation on the capacitor $C_{64}$ subject to the estimation by using the following (Exp. 14):

[Math. 10]

$$\frac{\int V_{drive} C_{12} D_1 E_2 E_4 D_6 dt}{T} \quad \text{(Exp. 14)}$$

where T is a period of the code sequence D or E. For simplicity, assuming that $V_{drive} \times C_{12} = 1$, the following (Exp. 15) is given:

[Math. 11]

$$\frac{\int D_1 E_2 E_4 D_6 dt}{T} = 1 \quad \text{(Exp. 15)}$$

This leads to a mistaken recognition of a touch input in a location in the vicinity of the intersection between the sense line $SL_4$ and the drive line $DL_6$.

Such a result is caused for the reason that although the code sequences $D_1$, $E_2$, $E_4$, and $D_6$ are code sequences between which there is a low cross-correlation, a code sequence generated by multiplying the code sequences $D_1$, $E_2$, and $E_4$ matches the code sequence $D_6$.

Figure 13:
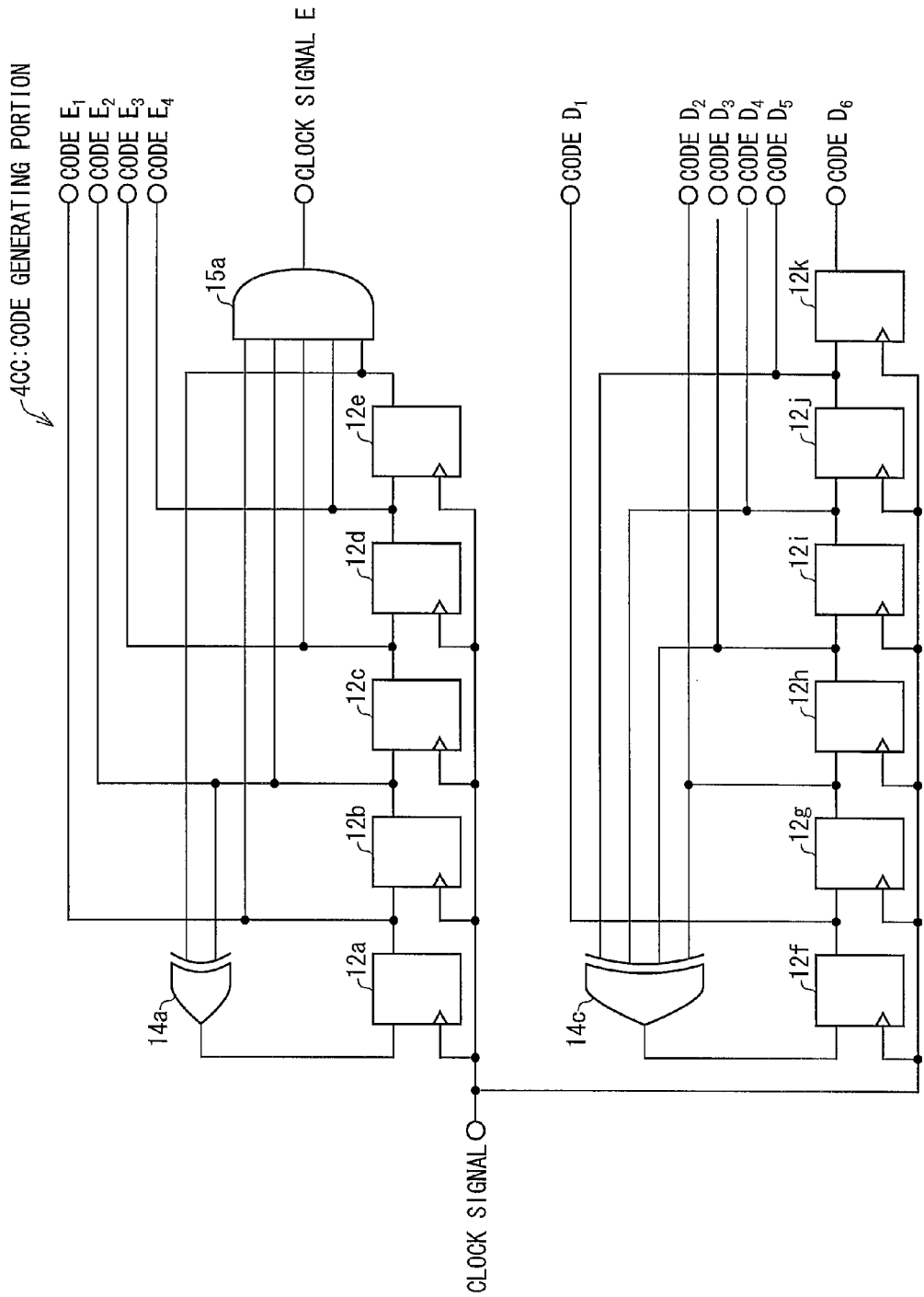
FIG. 13 is a diagram showing the configuration of a code generating portion provided in the touch panel device.

In view of this, using the code sequence D and the code sequence E as a preferred pair of code sequences eliminates the occurrence of the event that a code sequence generated by multiplying some code sequences matches other code sequence. FIG. 13 shows an example of a code generator for generating code sequences serving as the preferred pair of code sequences.

Configuration of the Code Generating Portion 4CC

FIG. 13 is a diagram showing the configuration of the code generating portion 4CC provided in the touch panel device 7C. Constituent elements which are the same as those described above are given the same reference signs. Detailed explanation of these constituent elements is therefore omitted.

The code generating portion 4CC has six shift registers $12f$ to $12k$ connected in series. To the shift registers $12f$ to $12k$, a clock signal is inputted. To the shift register $12f$, an output signal from the shift register $12e$ is inputted.

The code generating portion 4CC has a XOR gate $14c$. The XOR gate $14c$ generates a signal based on the code sequence $D_2$ generated by the shift register $12g$, the code sequence $D_3$ generated by the shift register $12h$, the code sequence 4 generated by the shift register $12i$, and the code sequence $D_5$ generated by the shift register $12j$, and then feeds the signal thus generated to the shift register $12f$. The shift register $12f$ generates the code sequence $D_1$, and the shift register $12k$ generates the code sequence $D_6$.

The code sequences $E_1$ to $E_4$ are generated by the linear feedback shift registers $12a$ to $12e$ as in the code generating portion 4C in FIG. 12. The code sequences $D_1$ to $D_6$ are generated by the linear feedback shift registers $12f$ to $12k$ whose feedback positions are different from those of the linear feedback shift registers $12a$ to $12e$. The five shift registers $12f$ to $12j$ makes up a linear feedback shift register to cause the outputs from the shift registers $12g$ to $12j$ to be fed back into the input of the shift register $12f$ via the XOR gate 14C. In order to obtain six sequences, the shift register $12k$ is used.

In a case where the code generating portion 4CC is applied to the touch panel device 7C shown in FIG. 11, an obtained capacitance pattern is given by the following (Exp. 16):

[Math. 12]

$$\begin{bmatrix} C_{11} & C_{21} & C_{31} & C_{41} & C_{51} & C_{61} \\ C_{12} & C_{22} & C_{32} & C_{42} & C_{52} & C_{62} \\ C_{13} & C_{23} & C_{33} & C_{43} & C_{53} & C_{63} \\ C_{14} & C_{24} & C_{34} & C_{44} & C_{54} & C_{64} \end{bmatrix} = \quad \text{(Exp. 16)}$$

$$\begin{bmatrix} 0.0666 & 0.0252 & 0.2162 & 0.0046 & 0.1337 & 0.0045 \\ 0.5621 & 0.0253 & 0.0664 & 0.0871 & 0.0253 & 0.0253 \\ 0.0456 & 0.0460 & 0.0666 & 0.0458 & 0.1749 & 0.1544 \\ 0.0459 & -0.1040 & 0.1956 & 0.1956 & 0.0045 & 0.0252 \end{bmatrix} \text{pF}$$

The capacitance value of $C_{12}$ is 0.5621, which is higher than the other capacitance values. From this, it can be judged that a touch input in a location in the vicinity of the intersection between the sense line $SL_2$ and the drive line $DL_1$ is successfully detected.

However, it is known that correlation between the code sequence D and the code sequence E both of which are the preferred pair obtained by the code generator using the linear feedback shift register being made up of the five shift registers is −9/31 at the maximum, which is higher than −1/31 that is cross-correlation between the M-sequence-based code sequences shown in FIG. 6, and a large error therefore develops. It is known that the longer a period of a code sequence, the lower correlation between code sequences obtained by different generators. Accordingly, an error can be reduced by using a sequence with a long period.

Further, since the error varies depending upon a sequence (in the case of the code generator that can be made up of five shift registers in the present embodiment, correlation takes the following three values: −1/31, 7/31, and −9/31), the error can be reduced by using code sequences in such a manner that they are changed for each period and then calculating an average of the output values. A capacitance estimation result obtained by randomly changing drive lines to which the code sequences $D_1$ to $D_6$ are to be given and then calculating an average of output values of eight periods of the code sequences is given by the following (Exp. 17):

[Math. 13]

$$\begin{bmatrix} C_{11} & C_{21} & C_{31} & C_{41} & C_{51} & C_{61} \\ C_{12} & C_{22} & C_{32} & C_{42} & C_{52} & C_{62} \\ C_{13} & C_{23} & C_{33} & C_{43} & C_{53} & C_{63} \\ C_{14} & C_{24} & C_{34} & C_{44} & C_{54} & C_{64} \end{bmatrix} = \begin{bmatrix} 0.0373 & 0.0735 & 0.0901 & 0.0333 & 0.0878 & 0.0650 \\ 0.5008 & 0.0328 & 0.0579 & 0.0397 & 0.0328 & 0.0547 \\ 0.0419 & 0.0562 & 0.1182 & 0.0947 & 0.0420 & 0.1361 \\ 0.0373 & 0.0402 & 0.1205 & 0.0923 & 0.0160 & 0.0598 \end{bmatrix} \text{pF} \quad \text{(Exp. 17)}$$

This indicates, as compared with the result obtained without the aforementioned drive line change, that a maximum value of estimation values for the capacitors other than the capacitor $C_{12}$ is 0.1205 pF, which is a value for $C_{34}$ in Exp. 17, lower than 0.2162 pF, which is a value for $C_{31}$ in Exp. 16. This confirms a decrease in error. In the present embodiment, the preferred pair of sequences are generated based on the M-sequences. However, other sequences such as Gold sequences may be alternatively employed.

Embodiment 5

Configuration of Portable Phone 100

A portable phone 100, i.e. an example of an electronic device mounted with a touch panel 102 that is controlled by an integrated circuit of the present invention, is described with reference to FIG. 14.

FIG. 14 is a block diagram showing a configuration of the portable phone 100 in accordance with Embodiment 5. The portable phone 100 includes a CPU 110, RAM 112, ROM 111, a camera 113, a microphone 114, a speaker 115, an operation key 116, a display panel 118, a display control circuit 109, and a touch panel system 101. These constituent elements are connected to one another via data buses.

The CPU 110 controls how the portable phone 100 operates. The CPU 110 executes a program stored, for example, in the ROM 111. The operation key 116 accepts an instruction from a user to the portable phone 100. The RAM 112 acts as a volatile storage for data generated by the execution of the program by the CPU 110 or data inputted via the operation key 116. The ROM 111 acts as a non-volatile storage for data.

Further, the ROM 111 is a writable and erasable ROM such as EPROM (Erasable Programmable Read-Only Memory) or a flash memory. Further, although not shown in FIG. 14, the portable phone 100 may include an interface (IF) via which the portable phone 100 is connected to another electronic device in a wired manner.

The camera 113 takes an image of a subject in accordance with operation of the operation key 116 by the user. Data representing the image taken of the subject is stored in the RAM 112 or an external memory (e.g. a memory card). The microphone 114 accepts input of sound of the user. The portable phone 100 digitalizes the sound (analog data) thus inputted. Then, the portable phone 100 sends the sound thus digitalized to a communication partner (e.g. another portable phone). The speaker 115, for example, outputs sound based on music data stored in the RAM 112.

The touch panel system 101 has a touch panel 102 and a touch panel controller 103 (integrated circuit). The CPU 110 controls how the touch panel system 101 operates. The CPU 110 executes a program stored, for example, in the ROM 111. The RAM 112 acts as a volatile storage for data generated by the execution of the program by the CPU 110. The ROM 111 acts as a non-volatile storage for data.

The display panel 118 is caused by the display control circuit 109 to display an image stored in the ROM 111 or the RAM 112. The display panel 118 may be joined on top of the touch panel 102, or may contain the touch panel 102.

The present invention is not limited to the description of the embodiments above, but may be altered by a skilled person within the scope of the claims. An embodiment based on a proper combination of technical means disclosed in different embodiments is encompassed in the technical scope of the present invention.

[Outline]

As described above, a touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence having K N-dimensional vectors to obtain K signals and then performs addition of the K signals to generate a second linear sum signal; a first inner product operation section which generates a first inner product operation signal by calculating an inner product of the second linear sum signal and the second code sequence; and a second inner product operation section which generates a second inner product operation signal for estimating values on the capacitors, by calculating an inner product of the first inner product operation signal and the first code sequence.

With this arrangement, multiplication of the K first linear sum signals by the second code sequence having K N-dimensional vectors is performed to obtain the K signals, and addition of the K signals is then performed to generate the second linear sum signal. This makes it possible to estimate values on the capacities on the basis of the second linear sum signal which is smaller in number than the first linear sum signals. Hence, it is possible to reduce the number of circuits required to process the signals for estimating the values on the capacitors. Consequently, it is possible to provide a touch panel controller having a small mounting area.

Another touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence having K N-dimensional vectors to obtain K signals and then performs addition of the K signals to generate a second linear sum signal; and an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

With this arrangement, multiplication of the K first linear sum signals by the second code sequence having K N-dimensional vectors is performed to obtain the K signals, and addition of the K signals is then performed to generate the second linear sum signal. This makes it possible to estimate values on the capacities on the basis of the second linear sum signal which is smaller in number than the first linear sum signals. Hence, it is possible to reduce the number of circuits required to process the signals for estimating the values on the capacitors. Consequently, it is possible to provide a touch panel controller having a small mounting area.

Still another touch panel controller in accordance with an aspect of the present invention is a touch panel controller for controlling a touch panel including capacitors provided at respective intersections between M drive lines and N sense lines, the touch panel controller including: a drive section which drives the M drive lines in parallel with each other on a basis of a first code sequence having K M-dimensional vectors to cause K first linear sum signals based on electric charges on the capacitors to be outputted through the N sense lines; a multiplying section which performs multiplication of the K first linear sum signals by a second code sequence to obtain K signals and then performs addition of the K signals to generate a second linear sum signal, the second code sequence having K N-dimensional vectors and being a preferred pair with the first code sequence; and an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

With this arrangement, multiplication of the K first linear sum signals by the second code sequence having K N-dimensional vectors and being a preferred pair with the first code sequence is performed to obtain the K signals, and addition of the K signals is then performed to generate the second linear sum signal. This makes it possible to estimate values on the capacities on the basis of the second linear sum signal which is smaller in number than the first linear sum signals. Hence, it is possible to reduce the number of circuits required to process the signals for estimating the values on the capacitors. Consequently, it is possible to provide a touch panel controller having a small mounting area.

The term "preferred pair" used herein is defined as follows. That is, assuming that M-sequences of code length of $2^n-1$ are generated by two M-sequence generating circuits, i.e. first and second M-sequence generating circuits, and that an absolute value of cross-correlation between an arbitrary sequence generated by the first M-sequence generating circuit and an arbitrary sequence generated by the second M-sequence generating circuit is $(2^{(N+1/2)}+1)/(2^N-1)$ at maximum when N is an odd number and $(2^{(N+2/2)}+1)/(2^N-1)$ at maximum when N is an even number, the sequence generated by the first M-sequence generating circuit and the M-sequence generated by the second M-sequence generating circuit are the preferred pair of sequences.

Yet another touch panel controller in accordance with an aspect of the present invention is preferably arranged such that values of the first code sequence are changed for each single period of the second code sequence, or values of the second code sequence are changed for each single period of the first code sequence.

With the above arrangement, multiplication of the K first linear sum signals by the second code sequence having K N-dimensional vectors is performed to obtain the K signals, and addition of the K signals is then performed to generate the second linear sum signal. This makes it possible to estimate values on the capacities on the basis of the second linear sum signal which is smaller in number than the first linear sum signals. Hence, it is possible to reduce the number of circuits required to process the signals for estimating the values on the capacitors. Consequently, it is possible to provide a touch panel controller having a small mounting area.

Still another touch panel controller in accordance with an aspect of the present invention is preferably arranged to further include: a code generating section which generates at least one of the first code sequence and the second code sequence.

With the above arrangement, the touch panel controller generates at least one of the first code sequence and the second code sequence. This eliminates the need for the touch panel controller to receive at least one of the first code sequence and the second code sequence from an external entity.

An integrated circuit in accordance with an aspect of the present invention includes a touch panel controller, according to the present invention, integrated therewith.

A touch panel device in accordance with an aspect of the present invention includes: a touch panel including capacitors provided at respective intersections between M drive lines and N sense lines; and a touch panel controller, according to the present invention, controlling the touch panel.

An electronic device in accordance with an aspect of the present invention includes: a touch panel including capacitors provided at respective intersections between M drive lines and N sense lines; and a touch panel controller, according to the present invention, controlling the touch panel.

INDUSTRIAL APPLICABILITY

The present invention is applicable to a touch panel controller that controls a touch panel having capacitors provided at respective intersections between a plurality of drive lines and a plurality of sense lines, an integrated circuit, a touch panel device, and an electronic device.

REFERENCE SIGNS LIST 1, 1A Touch panel controller
2, 2A Multiplying portion (multiplying section)
3A Inner product operation portion (first inner product operation section)
3AA Inner product operation portion (second inner product operation section)
3B Inner product operation portion (inner product operation section)
4A Code generating portion (code generating section)

5, 5A Capacitor drive portion (drive section)
6, 6A Touch panel
7, 7A Touch panel device
8, 8A Code multiplying portion
9, 9A Amplifying portion
10 Operational amplifier
11 ADC (analogue-to-digital converter)
12a to 12k Shift register
14a, 14b XOR gate
15a, 15b Clock generating portion
16 Multiplier
17 Integrator
18a, 18b Code sequence multiplying portion
100 Portable phone (electronic device)

The invention claimed is:

1. A touch panel controller for controlling a touch panel including capacitors provided at respective intersections between M drive lines and N sense lines,
the touch panel controller comprising:
a drive section which drives the M drive lines in parallel with each other on a basis of a first code sequence having K M-dimensional vectors to cause K first linear sum signals based on electric charges on the capacitors to be outputted through the N sense lines;
a multiplying section which performs multiplication of the K first linear sum signals by a second code sequence having K N-dimensional vectors to obtain K signals and then performs addition of the K signals to generate a second linear sum signal;
a first inner product operation section which generates a first inner product operation signal by calculating an inner product of the second linear sum signal and the second code sequence; and
a second inner product operation section which generates a second inner product operation signal for estimating values on the capacitors, by calculating an inner product of the first inner product operation signal and the first code sequence.

2. The touch panel controller according to claim 1, wherein values of the first code sequence are changed for each single period of the second code sequence, or values of the second code sequence are changed for each single period of the first code sequence.

3. The touch panel controller according to claim 1, further comprising:
a code generating section which generates at least one of the first code sequence and the second code sequence.

4. An integrated circuit comprising a touch panel controller, according to claim 1, integrated therewith.

5. A touch panel device comprising:
a touch panel including capacitors provided at respective intersections between M drive lines and N sense lines; and
a touch panel controller, according to claim 1, controlling the touch panel.

6. An electronic device comprising:
a touch panel including capacitors provided at respective intersections between M drive lines and N sense lines; and
a touch panel controller, according to claim 1, controlling the touch panel.

7. A touch panel controller for controlling a touch panel including capacitors provided at respective intersections between M drive lines and N sense lines,
the touch panel controller comprising:
a drive section which drives the M drive lines in parallel with each other on a basis of a first code sequence having K M-dimensional vectors to cause K first linear sum signals based on electric charges on the capacitors to be outputted through the N sense lines;
a multiplying section which performs multiplication of the K first linear sum signals by a second code sequence having K N-dimensional vectors to obtain K signals and then performs addition of the K signals to generate a second linear sum signal; and
an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

8. The touch panel controller according to claim 7, wherein values of the first code sequence are changed for each single period of the second code sequence, or values of the second code sequence are changed for each single period of the first code sequence.

9. The touch panel controller according to claim 7, further comprising:
a code generating section which generates at least one of the first code sequence and the second code sequence.

10. An integrated circuit comprising a touch panel controller, according to claim 7, integrated therewith.

11. A touch panel device comprising:
a touch panel including capacitors provided at respective intersections between M drive lines and N sense lines; and
a touch panel controller, according to claim 7, controlling the touch panel.

12. An electronic device comprising:
a touch panel including capacitors provided at respective intersections between M drive lines and N sense lines; and
a touch panel controller, according to claim 7, controlling the touch panel.

13. A touch panel controller for controlling a touch panel including capacitors provided at respective intersections between M drive lines and N sense lines,
the touch panel controller comprising:
a drive section which drives the M drive lines in parallel with each other on a basis of a first code sequence having K M-dimensional vectors to cause K first linear sum signals based on electric charges on the capacitors to be outputted through the N sense lines;
a multiplying section which performs multiplication of the K first linear sum signals by a second code sequence to obtain K signals and then performs addition of the K signals to generate a second linear sum signal, the second code sequence having K N-dimensional vectors and being a preferred pair with the first code sequence; and
an inner product operation section which generates an inner product operation signal for estimating values on the capacitors, by calculating an inner product of (i) a signal obtained by multiplication of the second linear sum signal by one of the second code sequence and the first code sequence and (ii) one of the first code sequence and the second code sequence.

14. The touch panel controller according to claim 13, wherein
values of the first code sequence are changed for each single period of the second code sequence, or values of the second code sequence are changed for each single period of the first code sequence.

15. The touch panel controller according to claim 13, further comprising:
   a code generating section which generates at least one of the first code sequence and the second code sequence.

16. An integrated circuit comprising a touch panel controller, according to claim 13, integrated therewith.

17. A touch panel device comprising:
   a touch panel including capacitors provided at respective intersections between M drive lines and N sense lines; and
   a touch panel controller, according to claim 13, controlling the touch panel.

18. An electronic device comprising:
   a touch panel including capacitors provided at respective intersections between M drive lines and N sense lines; and
   a touch panel controller, according to claim 13, controlling the touch panel.

\* \* \* \* \*